(12) United States Patent
Kim et al.

(10) Patent No.: US 11,348,329 B2
(45) Date of Patent: May 31, 2022

(54) METHOD AND APPARATUS FOR RECOGNIZING A BUSINESS CARD USING FEDERATED LEARNING

(71) Applicant: LG ELECTRONICS INC., Seoul (KR)

(72) Inventors: Daesung Kim, Seoul (KR); Heeyeon Nah, Seoul (KR); Jaewoong Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 387 days.

(21) Appl. No.: 16/565,417

(22) Filed: Sep. 9, 2019

(65) Prior Publication Data

US 2020/0005071 A1    Jan. 2, 2020

(30) Foreign Application Priority Data

Aug. 15, 2019    (KR) ........................ 10-2019-0099978

(51) Int. Cl.
| | |
|---|---|
| *G06V 10/422* | (2022.01) |
| *G06N 20/00* | (2019.01) |
| *G06K 9/62* | (2022.01) |
| *G06N 5/04* | (2006.01) |
| *G06V 30/10* | (2022.01) |

(52) U.S. Cl.
CPC ......... *G06V 10/422* (2022.01); *G06K 9/6256* (2013.01); *G06N 5/04* (2013.01); *G06N 20/00* (2019.01); *G06V 30/10* (2022.01)

(58) Field of Classification Search
None
See application file for complete search history.

(56) References Cited

U.S. PATENT DOCUMENTS

| | | | |
|---|---|---|---|
| 8,840,028 B1* | 9/2014 | Zheng .................... | H04L 51/28 235/472.01 |
| 2020/0005081 A1* | 1/2020 | Nah .................... | G06F 3/04883 |
| 2020/0242332 A1* | 7/2020 | Lenchner .............. | G06Q 10/06 |
| 2021/0166158 A1* | 6/2021 | Han ....................... | G06N 3/063 |

* cited by examiner

*Primary Examiner* — Dov Popovici
(74) *Attorney, Agent, or Firm* — Lee, Hong, Degerman, Kang & Waimey PC

(57) ABSTRACT

Provided is a method of recognizing a business card by a terminal through federated learning, including receiving an image of the business card; extracting a feature value from the image including text related to a field of an address book set in the terminal; inputting the feature value into a first common prediction model and determining first text information from an output of the first common prediction model; analyzing a pattern of the first text information and inputting the first text information into the field; caching the first text information and second text information received for error correction of the first text information from a user; and training the first common prediction model using the image, the first text information, and the second text information, whereby each terminal may train and share the first common prediction model.

20 Claims, 13 Drawing Sheets

METHOD AND APPARATUS FOR RECOGNIZING A BUSINESS CARD USING FEDERATED LEARNING

CROSS-REFERENCE TO RELATED APPLICATION

Pursuant to 35 U.S.C. § 119(a), this application claims the benefit of earlier filing date and right of priority to Korean Patent Application No. 10-2019-0099978, filed on Aug. 15, 2019, the contents of which are hereby incorporated by reference herein in its entirety.

BACKGROUND OF THE INVENTION

Field of the Invention

The present disclosure relates to a method and apparatus for recognizing text of a business card in a terminal through federated learning.

Related Art

Optical character recognition (OCR) refers to obtaining an image of characters, which are written by a human or printed by a machine, by an image scanner and converting the obtained image into machine-readable characters. The OCR, software for converting a character image that may be obtained by image scanning into a format such as computer-editable character codes, or the like, started as a research field of artificial intelligence or machine vision.

A technology of recognizing text of a business card using OCR in a related art is obtaining text data of a large number of business cards from a server and learning a text recognition model of the business cards included in the server. However, in this technology, since raw data of an individual is transmitted to the server, leading to a problem in that personal information may be leaked and having a difficulty in collecting text data of a large number of business cards.

SUMMARY OF THE INVENTION

The present disclosure aims at solving the necessity and/or problems described above.

The present disclosure proposes a method of collecting learning data upon receiving a feedback operation for error correction from a user of each terminal and learning the data in each terminal.

The technical problems to be achieved by the present disclosure are not limited to the above-mentioned technical problems and any other technical problems that are not mentioned may be clearly understood by those skilled in the art to which the present disclosure pertains from the following descriptions.

In an aspect, a method of recognizing a business card of a terminal through federated learning, includes: receiving an image of the business card; extracting a feature value from the image including text related to a field of an address book set in the terminal; inputting the feature value into a first common prediction model and determining first text information from an output of the first common prediction model; analyzing a pattern of the first text information and inputting the first text information into the field; caching the first text information and second text information received for error correction of the first text information from a user; and training the first common prediction model using the image, the first text information, and the second text information, wherein the first common prediction model is received through a server and the first text information indicates text which can be mapped by the image.

The training of the first common prediction model may include: updating a weight-parameter of the first common prediction model using a hyper-parameter received from the server.

The method may further include: deleting the first text information and the second text information; transmitting the weight-parameter to the server; and applying a second common prediction model received from the server, wherein the second common prediction model is a model obtained by training the first common prediction model by the server using the weight-parameter received from at least one terminal.

The second text information may include correct answer text input by the user through an input area of the terminal based on the first text information input to the field, which is recognized by the user through an output screen of the terminal.

The applying of the second common prediction model may include training the first common prediction model using a weight-parameter extracted from the second common prediction model.

The method may further include: updating the field on the basis of the second text information.

The training of the first common prediction model may be performed when a condition set in the terminal is satisfied, and the condition may include a state where the terminal is being charged, a state where the terminal is connected to Wi-Fi, or a state where the terminal is in an idle mode.

The applying of the second common prediction model may be performed when a condition set in the terminal is satisfied, and the condition may include a state where permission of the user is input as a response to an update notification message output on the screen of the terminal, a state where the terminal is being charged, a state where the terminal is connected to Wi-Fi, or a state where the terminal is in an idle mode.

The second common prediction model may be a model obtained by training the first common prediction model when the weight-parameters of a certain number or greater set by the server are received.

In another aspect, a method for recognizing a business card of a server through federated learning includes: transmitting a first common prediction model for recognizing text from an image of a business card received by a terminal; transmitting, by the terminal, a hyper-parameter for training the first common prediction model; receiving a weight-parameter from the terminal; and training the first common prediction model using the weight-parameter, wherein the first common prediction model is transmitted to one or more of the terminal.

The method may further include: transmitting a second common prediction model to the terminal, wherein the second common prediction model may be obtained by training the first common prediction model using the weight-parameter.

The training of the first common prediction model may be performed when the weight-parameters of a certain number or greater are received.

The transmitting of the second common prediction model may include transmitting a weight-parameter extracted from the second common prediction model.

The transmitting of the second common prediction model to the terminal may be performed when a condition set in the terminal is satisfied, and the condition may include a state where the terminal is being charged, a state where the terminal is connected to Wi-Fi, or a state where the terminal is in an idle mode.

In another aspect, a terminal for performing a method for recognizing a business card through federated learning includes: a communication module; a memory; a display unit; and a processor, wherein the processor receives an image of the business card, extracts a feature value from the image including text related to a field of an address book set in the terminal, inputs the feature value into a first common prediction model, determines first text information from an output of the first common prediction model, analyzes a pattern of the first text information, inputs the first text information into the field, caches the first text information and second text information received for error correction of the first text information from a user, and trains the first common prediction model using the image, the first text information, and the second text information, wherein the first common prediction model is received through a server and the first text information indicates text which can be mapped by the image.

DESCRIPTION OF EXEMPLARY EMBODIMENTS

Figure 1:
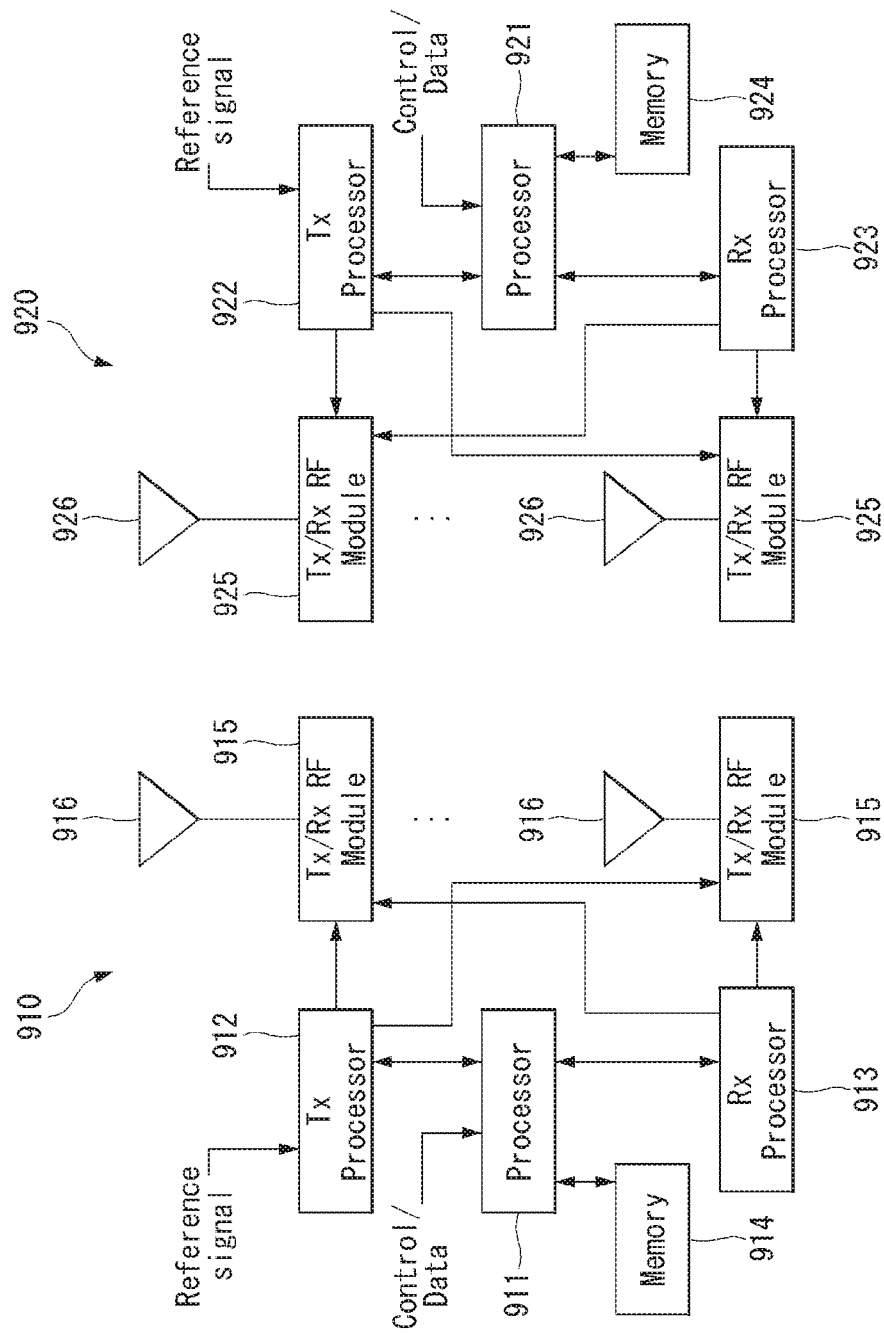
FIG. 1 illustrates a block diagram of a wireless communication system to which the methods proposed herein may be applied.

Hereinafter, exemplary embodiments disclosed herein will be described with reference to attached drawings, in which identical or like components are given like reference numerals regardless of reference symbols, and repeated description thereof will be omitted. Suffixes for components, "module" and "unit" used in the following description, will be given or used in place of each other taking only easiness of specification preparation into consideration, and they do not have distinguishable meanings or roles by themselves. Additionally, it is noted that the detailed description for related prior arts may be omitted herein so as not to obscure essential points of the disclosure. Further, the attached drawings are intended to facilitate the understanding of examples disclosed herein, and the technical spirit disclosed herein is not limited by the attached drawings, and rather should be construed as including all the modifications, equivalents and substitutes within the spirit and technical scope of the invention.

The terms including ordinal number such as, first, second and the like may be used to explain various components, but the components are not limited by the terms. Said terms are used in order only to distinguish one component from another component.

Further, when one element is referred to as being "connected" or "accessed" to another element, it may be directly connected or accessed to the other element or intervening elements may also be present as would be understood by one of skill in the art. On the contrary, when one element is referred to as being "directly connected" or "directly accessed" to another element, it should be understood as that the other element is not present between them.

Singular expression includes plural expression unless explicitly stated to the contrary in the context.

Herein, it should be understood that the terms "comprise," "have," "contain," "include," and the like are intended to specify the presence of stated features, numbers, steps, actions, components, parts or combinations thereof, but they do not preclude the presence or addition of one or more other features, numbers, steps, actions, components, parts or combinations thereof.

Hereinafter, autonomous driving apparatus requiring AI processed information, and/or 5th generation mobile communication which an AI processor requires will be described through sections A to G.

A. Example of UE and Network Block Diagram

FIG. 1 exemplifies a block diagram of a wireless communication system to which methods proposed herein may be applied.

Referring to FIG. 1, an apparatus (AI apparatus) including an AI module may be defined as a first communication apparatus (910 in FIG. 1), and a processor 911 may perform an AI specific action.

5G network including another apparatus (AI server) communicating with the AI apparatus may be as a second communication apparatus (920 in FIG. 1), and a processor 921 may perform an AI specific action.

The 5G network may be denoted as the first communication apparatus, and the AI apparatus may be denoted as the second communication apparatus.

For example, the first communication apparatus or the second communication apparatus may be a base station, a network node, a transmission terminal, a wireless apparatus, a wireless communication apparatus, a vehicle, a vehicle loaded with an autonomous driving function, a connected car, a drone (unmanned aerial vehicle, UAV), an artificial intelligence (AI) module, a robot, an augmented reality (AR) apparatus, a virtual reality (VR) apparatus, a mix reality apparatus, a hologram apparatus, a public safety apparatus, an MTC apparatus, an IoT apparatus, a medical apparatus, a fintech apparatus (or financial apparatus), a security apparatus, a climate/environmental apparatus, 5G service related apparatus or 4th industrial revolution field related apparatus.

For example, the terminal or user equipment (UE) may include a mobile phone, a smart phone, a laptop computer, a digital broadcasting terminal, a personal digital assistant (PDA), a portable multimedia player (PMP), a navigation, a slate PC, a tablet PC, a wearable devices, e.g., a smartwatch, a smart glass, a head mounted display (HMD), or the like. For example, the HMD may be a display apparatus which is worn on the head. For example, the HMD may be used to embody VR, AR or MR. For example, the drone may be a flying object which is flown by wireless control signals without a human on board. For example, the VR apparatus may include an apparatus for embodying an object or background of a virtual world. For example, the AR apparatus may include an apparatus which embodies by connecting an object or background of a virtual world to an object or background of a real world. For example, the MR apparatus may include an apparatus which embodies by fusing an object or background of a virtual world to an object or background of a real world. For example, the hologram apparatus may include an apparatus which embodies a hologram, i.e., 360 degree three-dimensional image, by recording and replaying three-dimensional information, utilizing Interference phenomenon of light produced when two laser lights meet. For example, the public safety apparatus may include an image relay apparatus or an imaging apparatus which is wearable onto the body of a user. For example, the MTC apparatus and the IoT apparatus may be an apparatus which does not require direct intervention or operation of a human. For example, the MTC apparatus and the IoT apparatus may include smart meters, bending machines, thermometers, smart light bulbs, door locks, various sensors or the like. For example, the medical apparatus may be an apparatus used to diagnose, cure, mitigate, treat, or prevent diseases. For example, the medical apparatus may be an apparatus used to diagnose, cure, mitigate or correct injuries or disabilities. For example, the medical apparatus may be an apparatus used for the purpose of inspecting, replacing, or transforming a structure or function. For example, the medical apparatus may be an apparatus used for the purpose of controlling pregnancy. For example, the medical apparatus may include medical devices, surgical devices, (in vitro) diagnostic devices, hearing aids, medical procedure devices or the like. For example, the security device may be a device installed to prevent danger that may occur and to maintain safety. For example, the security device may be cameras, CCTVs, recorders, black boxes or the like. For example, the fintech apparatus may be devices that may provide financial services such as mobile payments or the like.

Referring to FIG. 1, the first communication apparatus 910 and the second communication apparatus 920 include processors 911,921, memories 914,924, Tx/Rx radio frequency (RF) modules 915,925, Tx processors 912,922, Rx processors 913,923, antennas 916,926. The Tx/Rx module may be referred to as a transceiver. Each of Tx/Rx modules 915 transmits signals toward each of antennas 926. The processor embodies the function, the process and/or the method described above. The processor 921 may be related to a memory (924) which store program code and data. The memory may be referred to as a computer readable medium. More specifically, in DL (communication from the first communication apparatus to the second communication apparatus), the transmission TX processor 912 embodies various signal processing functions for a L1 layer (i.e., physical layer). The RX processor embodies various signal processing functions of the L1 (i.e., physical layer).

UL (communication from the second communication apparatus to the first communication apparatus) is processed in the first communication apparatus 910 in a similar way as described in connection with the receiving function in the second communication apparatus 920. Each of the Tx/Rx modules 925 receives signals via each of the antennas 926. Each of the Tx/Rx modules provides RF carrier and information to the Rx processor 923. The processor 921 may be related to a memory (924) which store program code and data. The memory may be referred to as a computer readable medium.

According to an example of the disclosure, the first communication apparatus may be a vehicle, and the second communication apparatus may be a 5G network.

B. Signal Transmitting/Receiving Method In Wireless Communication System

Figure 2:
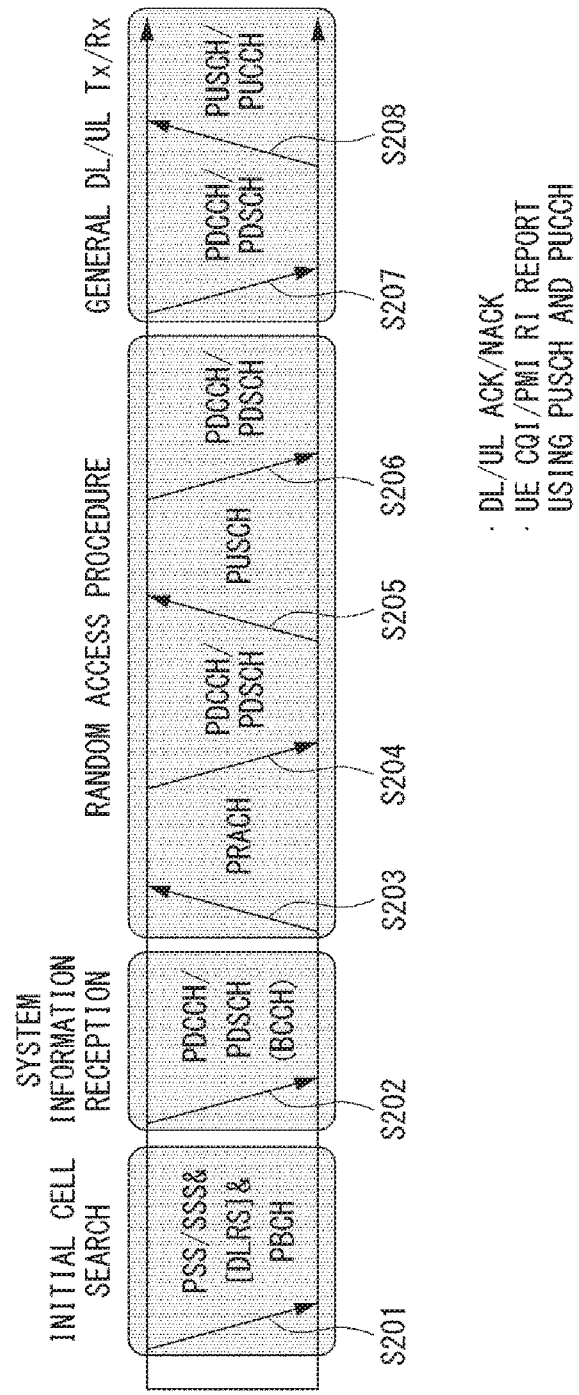
FIG. 2 shows an example of a signal transmitting/receiving method in a wireless communication system.

FIG. 2 is a drawing illustrating an example of a signal transmitting/receiving method in a wireless communication system.

Referring to FIG. 2, UE performs initial cell search tasks of synchronizing with BS or the like when turning on power or entering a new cell (S201). For this, UE may receive a primary synchronization channel (P-SCH) and a secondary synchronization channel (S-SCH) to be synchronized with BS and obtain information such as cell ID and the like. In a LTE system and a NR system, the P-SCH and the S-SCH are referred to as a primary synchronization signal (PSS) and a secondary synchronization signal (SSS), respectively. After the initial cell search, UE may receive a physical broadcast channel (PBCH) to obtain broadcast information within a cell. Meanwhile, UE may receive a downlink reference Signal (DL RS) at the initial cell search step to check a downlink channel state. After finishing the initial cell search, UE may obtain more specific system information by receiving a physical downlink control channel (PDCCH) and a physical downlink shared channel (PDSCH) according to information carried by the PDCCH (S202).

Meanwhile, UE may perform a random access procedure (RACH) to BS when there is no wireless resource for initial access or signal transmission to BS (Steps S203 to S206). For this, UE may transmit a certain sequence as a preamble via a physical random access Channel (PRACH) (S203 and S205), and receive a random access response (RAR) message for the preamble via PDCCH and corresponding PDSCH (S204 and S206). In a case of a contention based RACH, a contention resolution procedure may be further performed.

After performing procedures described above, UE may perform PDCCH/PDSCH reception (S207), and physical uplink shared Channel (PUSCH)/physical uplink control channel (PUCCH) transmission (S208) as a general uplink/downlink signal transmission procedure. Particularly, UE receives downlink control information (DCI) via PDCCH. UE monitors a set of PDCCH candidates on monitoring occasions configured in one or more control element sets (CORESET) on a serving cell according to corresponding search space configurations. The set of PDCCH candidates to be monitored by UE may be defined in terms of search space sets, and the search space set may be a common search space set or an UE specific search space set. CORESET is configured with a set of (physic) resource blocks having time duration of 1 to 3 OFDM symbols. The network may be configured, such that UE has a plurality of CORESET. UE monitors PDCCH candidates in one or more search space sets. Here, monitoring means trying to decode PDCCH candidates in the search space. When UE succeeds in decoding one of the PDCCH candidates in the search space, the UE determines that PDCCH has been searched from corresponding PDCCH candidates, and performs PDSCH reception or PUSCH transmission on the basis of DCI in detected PDCCH. PDCCH may be used to schedule DL transmission on PDSCH and UL transmissions on PUSCH. Here, DCI on PDCCH has a downlink assignment (i.e. downlink grant; DL grant), which at least includes the modulation and coding format and the resource allocation information related to the downlink share channel, or uplink grant (UL grant) that contains the modulation and coding format and the resource allocation information related to the uplink share channel.

Referring to FIG. 2, the initial access (IA) procedure in the 5G communication system will be further discussed.

UE may perform cell search, system information acquisition, beam alignment for initial access, DL measurement, and the like on the basis of SSB. SSB is used mixed with a Synchronization Signal/Physical Broadcast channel (SS/PBCH) block.

SSB is configured with PSS, SSS and PBCH. SSB is configured in four continuous OFDM symbols, and PSS, PBCH, SSS/PBCH or PBCH is transmitted according to OFDM symbols. PSS and SSS are respectively configured with one OFDM symbol and 127 subcarriers, and PBCH is configured with three OFDM symbol and 576 subcarriers.

Cell search means a procedure in which UE acquires time/frequency of a cell, and detects cell ID (Identifier) (e.g., Physical layer Cell ID (PCI)) of the cell. PSS is used to detects the cell ID in a cell ID group, and SSS is used to detect a cell ID group. PBCH is used to detect SSB (time) index and a half-frame.

There are 336 cell ID groups and 3 cell IDs per cell ID group. There are 1008 cell IDs in total. Information on the cell ID group which the cell ID of the cell belongs to is provided/obtained via SSS of the cell, and information on the cell ID among 336 cells in the cell ID is provided/obtained via PSS.

SSB is periodically transmitted to SSB periodicity. At the initial cell search, SSB basic periodicity assumed by UE is defined as 20 ms. After cell access, SSB periodicity may be configured to be one of {5 ms, 10 ms, 20 ms, 40 ms, 80 ms, 160 ms} by the network (e.g., BS).

Next, the system information (SI) acquisition will be described.

SI is divided into a master information block (MIB) and a plurality of system information blocks (SIBs). SI other than MIB may be referred to as Remaining Minimum System Information (RMSI). MIB includes information/parameter for monitoring of PDCCH which schedules PDSCH carrying SIB1 (SystemInformationBlock1), and is transmitted by BS via PBCH of SSB. SIB1 includes information related to the availability and scheduling (e.g., transmission cycles, SI-Windows sizes) of the remaining SIBs (hereinafter, referred to as SIBx, where x is an integer equal to or greater than 2). SIBx is included in SI message and transmitted via the PDSCH. Each SI message is transmitted within a periodically occurring time window (i.e., SI-Window).

Referring to FIG. 2, a random access (RA) process in the 5G communication system will be further discussed.

The random access process is used for a variety of purposes. For example, the random access process may be used for network initial access, handover and UE-triggered UL data transmission. UE may obtain UL synchronization and UL transmission resources through the random access process. The random access process is divided into a content-based random access process and a contention free random access process. Specific procedure for the contention based random access process is as follows.

UE may transmit the random access preamble as Msg1 of the random access process in UL via PRACH. Random access preamble sequences having two lengths different from each other are supported. The long sequence length 839 is applied to subcarrier spacing of 1.25 and 5 kHz, while the short sequence length 139 is applied to subcarrier spacing of 15, 30, 60 and 120 kHz.

When BS receives the random access preamble from UE, BS transmits the random access response (RAR) message (Msg2) to the UE. PDCCH, which schedules PDSCH carrying RAR, is CRC-masked by a random access (RA) wireless network temporary identifier (RNTI) (RA-RNTI) and transmitted. The UE which detects PDCCH masked by RA-RNTI may receive RARs from PDSCH which is scheduled by the DCI carried by the PDCCH. The UE checks that the random access response information for the preamble which has been transmitted by itself, i.e. Msg1, is within the RAR. Whether there is any random access information for Msg1 which has been transmitted by itself may be determined by whether there is a random access preamble ID for the preambles which has been transmitted by the UE. In the absence of a response to Msg1, the UE may retransmit the RACH preamble within a limited number of times while performing power ramping. The UE calculates the PRACH transmission power for retransmissions of the preamble on the basis of the most recent path loss and power ramp counter.

On the basis of the random access response information, the UE may transmit UL transmission over the uplink sharing channel as Msg3 of the random access process. Msg3 may include RRC connection requests and UE identifiers. As a response to Msg3, the network may transmit Msg4, which may be treated as a contention resolution message on the DL. By receiving Msg4, the UE may enter into a RRC-connected state.

C. Beam Management (BM) Procedure of 5G Communication System

A BM process may be divided into (1) a DL BM process using SSB or CSI-RS, and (2) an UL BM process using SRS (sound reference signal). Further, each BM process may include Tx beam sweeping to determine the Tx beam and Rx beam sweeping to determine the Rx beam.

DL BM process using SSB will now be described.

The setting for beam report using SSB is performed at channel state information (CSI)/beam setting in RRC_CONNECTED.

UE receives from BS, CSI-ResourceConfig IE containing CSI-SSB-ResourceSetList for SSB resources used for BM. The RRC parameter csi-SSB-ResourceSetList represents a list of SSB resources used for beam management and reporting in a set of resources. Here, the SSB resource set may be configured to be {SSBx1, SSBx2, SSBx3, SSBx4 . . . }. An SSB index may be defined as from 0 to 63.

The UE receives signals on SSB resources from the BS on the basis of the CSI-SSB-ResourceSetList.

If CSI-RS reportConfig related to reporting of SSBRI and reference signal received power (RSRP) is established, the UE reports best SSBRI and RSRP corresponding to it to BS. For example, if the reportQuantity of the CSI-RS reportConfig IE is set to 'ssb-Index-RSRP', the UE reports the best SSBRI and RSRP corresponding to it to BS.

If CSI-RS resources are set to same OFDM symbol(s) as SSB, and 'QCL-TypeD' is applicable, the UE may assume that CSI-RS and SSB are quasi co-located (QCL) from a point of view of the 'QCL-TypeD'. Here, QCL-TypeD may mean being QCL between antenna ports from a point of view of a spatial Rx parameter. The same receive beam may be applied when the UE receives signals from multiple DL antenna ports in the QCL-TypeD relationship.

Next, DL BM process using CSI-RS will now be described.

The Rx beam determination (or refinement) process of the UE using CSI-RS and the Tx beam swiping process of the BS will be are discussed in order. The Rx beam determination process of UE is set for a repetition parameter to be 'ON', and the Tx beam swiping process of BS is set for the repetition parameter to be 'OFF'.

First, the Rx beam determination process of the UE will be described.

The UE receives NZP CSI-RS resource set IE, which includes RRC parameters for 'repetition', from the BS through RRC signalling. Here, the RRC parameter 'repetition' is set to be 'ON'.

The UE repeatedly receives from OFDM symbols different from each other via the same Tx beam of the BS (or DL space domain transmission filter), signals on the resource(s) in the CSI-RS resource set in which the RRC parameter 'repetition' is set to be 'ON'.

UE determines its RX beam.

The UE omits the CSI report. That is, if the RRC parameter 'repetition' is set to be 'ON', the CSI report may be omitted.

Next, the Rx beam determination process of the BS will be described.

The UE receives NZP CSI-RS resource set IE, which includes RRC parameters for 'repetition', from the BS through RRC signalling. Here, the RRC parameter 'repetition' is set to be 'OFF', and related to the Tx beam sweeping process of BS.

The UE receives via the Tx beams of the BS different from each other (or DL space domain transmission filter), signals on the resources in the CSI-RS resource set in which the RRC parameter 'repetition' is set to be 'OFF'.

The UE selects (or determines) the best beam.

The UE reports the ID (e.g., CRI) and related quality information (e.g., RSRP) for the selected beam to BS. That is, the UE reports the CRI and RSRP for it to BS when CSI-RS is transmitted for BM.

Next, UL BM process using SRS will now be described.

The UE receives from the BS an RRC signalling (e.g., SRS-Config IE) containing the (RRC parameter) usage parameters set to 'beam management'. The SRS-Config IE is used for SRS transmission configuration. SRS-Config IE includes a list of SRS-Resources and a list of SRS-Resource-Sets. Each SRS resource set means a set of SRS-resources.

The UE determines Tx beamforming for SRS resources to be transmitted on the basis of the SRS-SpatialRelation Info included in SRS-Config IE. Here, the SRS-SpatialRelation Info is set for each SRS resources and indicates whether to apply the same beamforming as that used in SSB, CSI-RS, or SRS for each SRS resource.

If SRS-SpatialRelationInfo is set for an SRS resource, same beamforming as that used in SSB, CSI-RS, or SRS is applied and transmitted. However, if SRS-SpatialRelation Info is not set in the SRS resource, the UE arbitrarily determines the Tx beamforming and transmits the SRS through the determined Tx beamforming.

Next, a beam failure recovery (BFR) process will be described.

In a beamformed system, Radio Link Failure (RLF) may occur frequently due to rotation, movement or blockage of the UE. Therefore, BFR is supported in NR to prevent frequent RLFs from occurring. BFR is similar to the radio link failure recovery process, and may be supported if the UE is aware of the new candidate beam(s). To detect beam failure, BS sets beam failure detection reference signals to the UE, which declares beam failure, when the number of beam failure indications from the physical layer of the UE reaches the threshold set by the RRC signalling within the period set by the RRC signalling of the BS. After beam failure has been detected, the UE triggers a beam failure recovery by initiating the random access process on the PCell; select an appropriate beam to perform the beam failure recovery (if the BS provides dedicated random access resources for certain beams, these are preferred by the UE). Upon completion of the random access procedure, the beam failure recovery is considered completed.

D. URLLC (Ultra-Reliable and Low Latency Communication)

URLLC transmission defined in NR may mean transmission for (1) relatively low traffic size, (2) relatively low arrival rate, (3) extremely low latency requirement (e.g., 0.5 and 1 ms), (4) relatively short transmission duration (e.g., 2 OFDM symbols), (5) urgent service/message, and the like. For UL, transmission for a particular type of traffic (e.g., URLLC) needs to be multiplexed with other pre-scheduled transmission (e.g., eMBB) in order to satisfy more stringent latency requirement. In this regard, one way is to inform the pre-scheduled UE that it will be preempted for a particular resource and to cause URLLC UE to use the corresponding resource in UL transmission.

For NR, dynamic resource sharing between eMBB and URLLC is supported. eMBB and URLLC services may be scheduled on non-overlapping time/frequency resources, and URLLC transmission may occur in resources scheduled for ongoing eMBB traffic. The eMBB UE may not know whether the PDSCH transmission of the corresponding UE was partially punctured, and because of corrupted coded bit, the UE may not be able to decode the PDSCH. Taking this into consideration, NR provides preemption indiction. The above preemption indication may be referred to as the interrupted transmission indication.

With respect to preemption indication, the UE receives the DownlinkPreemption IE through RRC signalling from the BS. When the UE is provided with DownlinkPreemption IE, for monitoring of the PDCCH carrying DCI format 2_1, the UE is set with the INT-RNTI provided by parameter int-RNTI in the DownlinkPreemption IE. The above UE is further set with a set of serving cells by INT-Configuration-PerServing Cell containing a set of serving cell indexes provided by servingCellID and corresponding sets of locations for fields in DCI format 2_1 by positionInDCI, is set with information payload size for DCI format 2_1 by dci-payloadSize, and is set with indication granularity of time-frequency resources by timeFrequencySect.

The UE receives DCI format 2_1 from the BS on the basis of the DownlinkPreemption IE.

If the UE detects DCI format 2_1 for a serving cell in an established set of serving cells, it may be assumed that among the PRBs and sets of symbols in the last monitoring period before the monitoring period to which the DCI format 2_1 belongs transmits to the DCI format 2_1, none of PRBs and symbols indicated by the DCI format 2_1 transmits to the UE. For example, the UE regards a signal in a time-frequency resource indicated by the preemption as not a scheduled DL transmission to itself, and decodes the data on the basis of the signals received in the remaining resource areas.

E. mMTC (Massive MTC)

Massive Machine Type Communication (mMTC) is one of 5G's scenarios to support hyper-connected services that communicate simultaneously with a large number of UEs. In this environment, the UE communicates intermittently with extremely low transmission speed and mobility. Therefore, mMTC makes the main goal of how long the UE may be operated at low cost. Regarding mMTC technology, 3GPP deals with MTC and NB (NarrowBand)-IoT.

The mMTC technology features repetitive transmission, frequency hopping, retuning, guard section or the like of PDCCH, PUCCH, PSCH (physical downlink shared channel), PUSCH, and the like.

That is, PUCCH (or PUCCH) containing specific information (or PUCCH (especially long PUCCH) or PRACH) and PDSCH (or PDCCH) containing responses to specific information are repeatedly transmitted. Repetitive transmission is performed via frequency hopping, for repetitive transmission, (RF) retuning is performed in a guard period from the primary frequency resource to the secondary frequency resource, and specific information and response to specific information are transmitted/received via narrowband (e.g., 6 RB (resource block) or 1 RB).

F. AI Basic Operation Using 5G Communication

Figure 3:
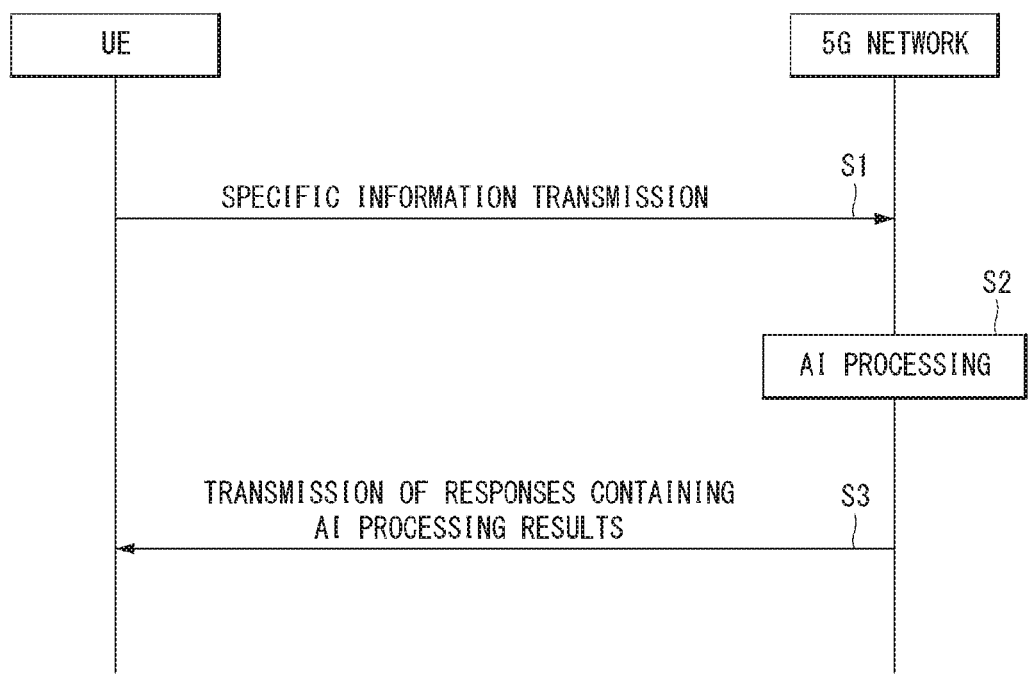
FIG. 3 shows an example of basic operations of a user terminal and a 5G network in a 5G communication system.

FIG. 3 shows an example of the basic operation of a 5G network and a user terminal in a 5G communication system.

UE transmits specific information transmission to the 5G network (S1). And, the 5G network performs 5G processing for the specific information (S2). Here, the 5G processing may include AI processing. Further, the 5G network transmits responses containing AI processing results to the UE (S3).

G. Application Operation Between the User's Terminal and the 5G Network on a 5G Communication System Hereinafter, AI operation using 5G communication will be more specifically described with reference to FIGS. 1 and 2, and wireless communication techniques (BM procedure, URLLC, Mmtc, and the like) discussed above.

First, the method proposed in this disclosure to be later described and the basic procedure of application operation applied by eMBB technology of 5G communication will be explained.

In order for the UE to transmit/receive signals, information or the like with 5G network, as in steps S1 and S3 of FIG. 3, the UE performs initial access procedures and random access procedures prior to step S1 of FIG. 3 altogether with 5G network.

More specifically, the UE performs initial access procedures together with 5G network on the basis of the SSB to obtain DL synchronization and system information. In the initial access process, a beam management (BM) process, a beam failure recovery process may be added, and quasi-co location (QCL) relationship may be added in the process of the UE receiving signals from 5G network.

The UE also performs random access procedures together with 5G network for UL synchronization acquisition and/or UL transmission. And, the above 5G network may transmit UL grant to schedule the transmission of specific information to the UE. Therefore, the UE transmits specific information to the 5G network on the basis of the UL grant. And, the 5G network transmits DL grant to schedule the transmission of result of 5G processing on specific information to the UE. Therefore, the 5G network may transmit responses containing AI processing results to the UE on the basis of the above DL grant.

Next, the method proposed in this disclosure to be later described and the basic procedure of application operation applied by URLLC technology of 5G communication will be explained.

As described above, after the UE performs the initial access procedure and/or the random access procedure altogether with 5G network, the UE may receive the DownlinkPreemption IE from the 5G network. And, the UE receives DCI format 2_1 containing pre-emption indication from the 5G network on the basis of DownlinkPreception IE. Further, the UE does not perform (or expect or assume) the receipt of eMBB data from resources (PRB and/or OFDM symbols) indicated by the pre-emption indication. Then, the UE may receive UL grant from the 5G network if it needs to transmit certain information.

Next, the method proposed in this disclosure to be later described and the basic procedure of application operation applied by mMTC technology of 5G communication will be explained.

The part of the steps of FIG. 3, which is changed by the application of the mMTC technology, will be mainly described.

In the step S1 of FIG. 3, the UE receives UL grant from the 5G network in order to transmit certain information to the 5G network. Here, the UL grant may contain information on the number of repetitions for the transmission of specific information, which may be transmitted repeatedly on the basis of information about the number of repetitions. That is, the UE transmits specific information to the 5G network on the basis of the UL grant. And, repeated transmission of specific information may be made through frequency hopping, the first specific information may be transmitted at the first frequency resource, and the second specific information may be transmitted at the second frequency resource. The specific information may be transmitted through narrowband of 6 RB (Resource Block) or 1 RB (Resource Block).

5G communication technology described above may be combined with and applied to methods proposed in this to be described later, or may be provided to embody or clarify the technical features of the methods proposed in this disclosure.

Figure 4:
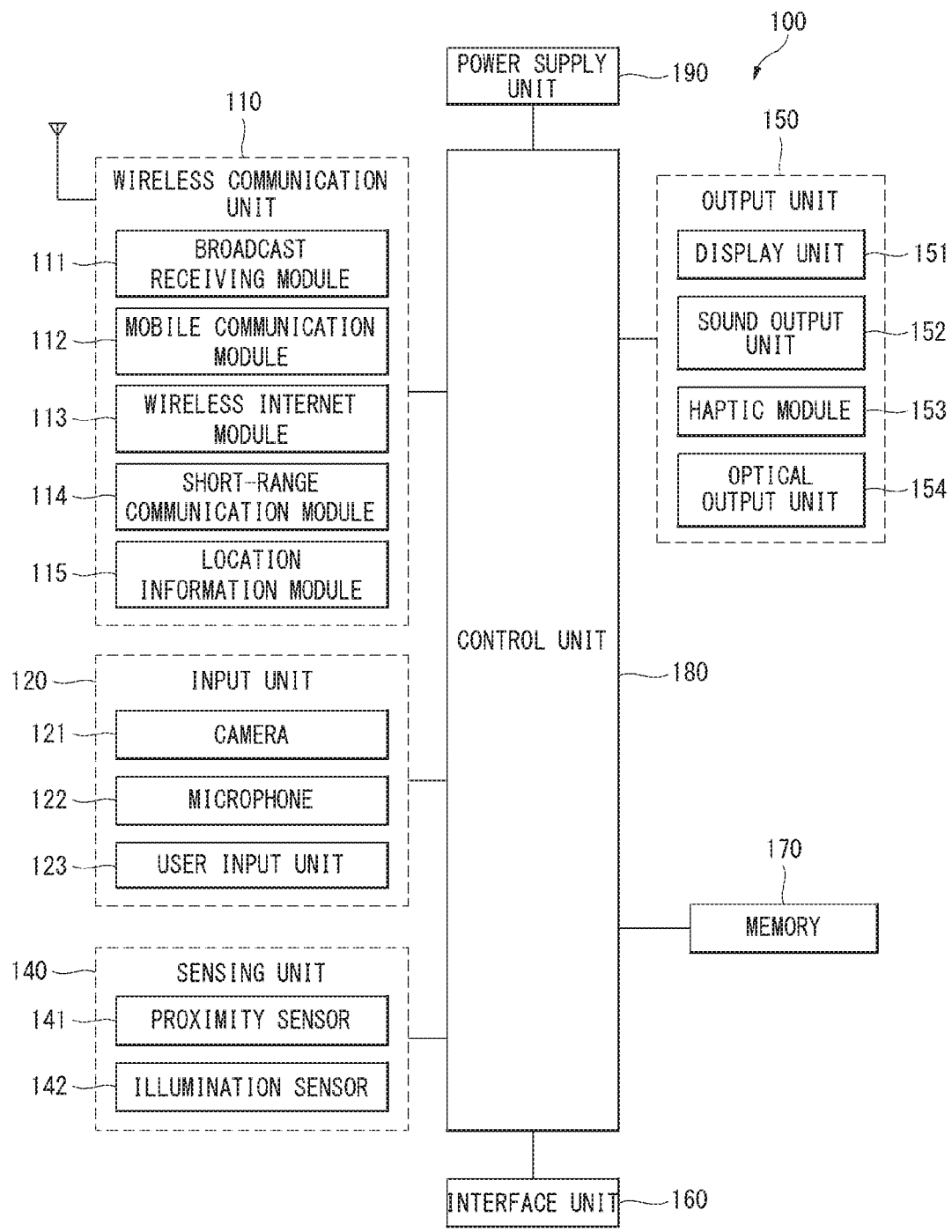
FIG. 4 is a block diagram illustrating an electronic device related to the present disclosure.

FIG. 4 is a block diagram illustrating an electronic device related to the present disclosure.

The electronic device 100 may include a wireless communication unit 110, an input unit 120, a sensing unit 140, an output unit 150, an interface unit 160, a memory 170, a controller 180, and a power supply unit 190. The components illustrated in FIG. 4 are not a requirement and the electronic device described in this disclosure may have greater or fewer components than those listed above.

More specifically, the wireless communication unit 110, among the above-mentioned components, includes one or more modules which allow wireless communications between the electronic device 100 and a wireless communication system, between the electronic device 100 and another electronic device, or between the electronic device 100 and an external server.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit for inputting an image signal, a microphone 122 or an audio input unit for inputting an audio signal, a user input unit 123 (e.g., a touch key, a push key (mechanical key), etc.) for receiving information from a user, and the like. Audio data or image data collected by the input unit 120 may be analyzed and processed as a control command of the user.

The sensing unit 140 may include at least one sensor for sensing at least one of information in the electric device, surrounding environment information of the electric device, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared sensor, a finger scan sensor, an ultrasonic sensor, an optical sensor (e.g., camera 121), a microphone 122, a battery gauge, an environmental sensor (e.g., a barometer, a hygrometer, a thermometer, a radiation detection sensor, a thermal sensor, a gas sensor, etc.), a chemical sensor (e.g., an electronic nose, a healthcare sensor, a biometric sensor, etc.). Meanwhile, the electric device disclosed in the present disclosure may combine and utilize information sensed by at least two of the sensors.

The output unit 150 serves to generate an output related to visual, auditory or tactile sense and includes at least one of a display unit 151, an audio output unit 152, a haptic module 153, and a light output unit 154. The display unit 151 may have an inter-layer structure with a touch sensor or may be integrally formed to realize a touch screen. The touch screen may serve as a user input unit 123 that provides an input interface between the electronic device 100 and a user, and provide an output interface between the electronic device 100 and the user.

The interface unit 160 serves as an interface with various types of external devices that are connected to the electronic device 100. The interface unit 160 may include at least one of wired/wireless headset ports, external power supply ports, wired/wireless data ports, memory card ports, ports for connecting a device having an identification module, audio input/output (I/O) ports, video I/O ports, and earphone ports. When an external device is connected to the interface unit 160, the electronic device 100 may perform appropriate control in relation to the connected external device.

The memory 170 stores data supporting various functions of the electronic device 100. The memory 170 may store a plurality of application programs or applications that are driven in the electronic device 100, data for operation of the electronic device 100, and commands. At least some of these applications may be downloaded from an external server via wireless communication. At least some of these application programs may exist on the electronic device 100 when the electronic device 100 was released from the factory for basic functions (e.g., call incoming and call outgoing function, message reception and message sending function) of the electronic device 100. Meanwhile, the application programs may be stored in the memory 170, installed on the electronic device 100, and may be driven by the controller 180 to perform an operation (or function) of the electric device.

In addition to the operations related to the application programs, the controller 180 typically controls an overall operation of the electronic device 100. The controller 180 may process signals, data, information, and the like, input or output through the components described above or may drive an application program stored in the memory 170 to provide or process appropriate information or functions to the user.

The controller 180 may control at least some of the components shown in FIG. 4 to drive an application program stored in the memory 170. In addition, in order to drive the application program, the controller 180 may operate at least two of the components included in the electronic device 100 in combination with each other.

The power supply unit 190 supplies power to the components included in the electronic device 100 under the control of the controller 180 upon receiving external power and internal power. The power supply unit 190 may include a battery, and the battery may be an internal battery or a replaceable battery.

At least some of the components may operate in cooperation with each other to implement an operation, control, or a control method of the electric device according to various embodiments described below. In addition, the operation, control, or control method of the electric device may be implemented on the electric device by driving at least one application program stored in the memory 170.

Hereinafter, the components listed above will be described in more detail with reference to FIG. 4 before explaining various embodiments implemented through the electronic device 100 as described above.

First, referring to the wireless communication unit 110, the broadcast receiving module 111 of the wireless communication unit 110 receives broadcast signals and/or broadcast-related information from an external broadcast management server through a broadcast channel. The broadcast channel may include a satellite channel and a terrestrial channel. Two or more broadcast receiving modules may be provided to the electronic device 100 for simultaneous broadcast reception or broadcast channel switching for at least two broadcast channels.

The mobile communication module 112 may transmit and receive a wireless signal to and from at least one of a base station, an external electric device, and a server in a mobile communication network established according to technical standards or communication scheme for mobile communication (e.g., GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.

The wireless signal may include various types of data according to transmission/reception of a voice call signal, a video call signal, or a text/multimedia message.

The wireless Internet module 113 is a module for wireless Internet access, and may be provided within or outside the electronic device 100. The wireless Internet module 113 is configured to transmit and receive a wireless signal in a communication network according to wireless Internet technologies.

Examples of the wireless Internet technologies include a WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), and the wireless Internet module 113 transmits and receives data according to at least one wireless Internet technology in a range including Internet technologies not listed above.

From a viewpoint that wireless Internet access by WiBro, HSDPA, HSUPA, GSM, CDMA, WCDMA, LTE and LTE-A is performed through a mobile communication network, the wireless Internet module 113 performing wireless Internet access through the mobile communication network may be understood as a kind of the mobile communication module 112.

The short-range communication module 114 is for short-range communication and may support short-range communication using at least one of Bluetooth™, an RFID (Radio Frequency Identification), an Infrared Data Association (IrDA), UWB (Ultra Wideband), ZigBee, NFC (Near Field Communication), Wi-Fi (Wireless-Fidelity), Wi-Fi Direct, Wireless USB (Wireless Universal Serial Bus), magnetic secure transmission (MST). The short-range communication module 114 may support wireless communication between the electronic device 100 and a wireless communication system, between the electronic device 100 and another electronic device 100, or between the electronic device 100 and a network where another electronic device 1000 (or external server) is positioned through a wireless area network. The short-range wireless communication network may be a wireless personal area network.

Here, the other electronic device 100 may be a wearable device (e.g., smartwatch, smart glass, head mounted display (HMD), etc.) capable of exchanging data with the electronic device 100 according to the present disclosure. The short-range communication module 114 may detect (or recognize) a wearable device capable of communicating with the electronic device 100 around the electronic device 100. Further, if the detected wearable device is a device authenticated to communicate with the electronic device 100 according to the present disclosure.

If the detected wearable device is a device authenticated to communicate with the electronic device 100 according to the present disclosure, the controller 180 may transmit at least a part of data processed in the electronic device 100 to the wearable device through a local communication module 114. Therefore, a user of the wearable device may use the data processed in the electronic device 100 through the wearable device. For example, when a call is received in the electronic device 100, the user may perform call communication through the wearable device, or when a message is received by the electronic device 100, the user may read the received message via the wearable device.

The location information module 115 is a module for obtaining a location (or current location) of the electric device, and a typical example thereof is a global positioning system (GPS) module or a wireless fidelity (Wi-Fi) module. For example, when the electric device utilizes a GPS module, the electric device may obtain a location of the electric device using signals transmitted from GPS satellites. As another example, when the electric device utilizes the Wi-Fi module, the electric device may obtain the location of the electric device on the basis of information of a wireless access point (AP) that transmits or receives a wireless signal to or from the Wi-Fi module. If necessary, the location information module 115 may perform any of the other functions of the wireless communication unit 110 to substitutively or additionally obtain data regarding a location of the electric device. The location information module 115 is a module used to obtain the location (or the current location) of the electric device, and is not limited to the module that directly calculates or obtains the location of the electric device.

The input unit 120, which is for inputting image information (or signal), audio information (or signal), data, or information input from a user, may include one or a plurality of cameras 121 to input image information. The camera 121 processes image frames of a still image or a moving image obtained by the image sensor in a video communication mode or an image capturing mode. The processed image frame may be displayed on the display unit 151 or stored in the memory 170. The plurality of cameras 121 provided in the electronic device 100 may be arranged to form a matrix structure and a plurality of pieces of image information having a variety of angles or foci may be input to the electronic device 100. In addition, the plurality of cameras 121 may be arranged in a stereo structure to obtain a left image and a right image for realizing a stereoscopic image.

The microphone 122 processes an external acoustic signal to electrical voice data. The processed voice data may be utilized variously according to a function (or an executed application program) being executed in the electronic device 100. Meanwhile, the microphone 122 may include various noise canceling algorithms for canceling noise generated in the process of receiving an external sound signal.

The user input unit 123 is a component for receiving information from the user. When information is input through the user input unit, the controller 180 may control an operation of the electronic device 100 to correspond to the input information. The user input unit 123 may include a mechanical input unit (or a mechanical key, for example, a button located on the front, rear, or side of the electronic device 100, a dome switch, a jog wheel, jog switch, etc.) and touch-type input unit. For example, the touch-type input unit may be configured as a virtual key, a soft key, or a visual key displayed on a touch screen through software processing or configured as a touch key disposed on a portion other than the touch screen. Meanwhile, the virtual key or the visual key may have various forms and may be displayed on the touch screen and may be configured as, for example, graphic, text, an icon, video, or a combination thereof.

The sensing unit 140 senses at least one of internal information of the electric device, surrounding environment information of the electric device, and user information, and generates a corresponding sensing signal. The controller 180 may control driving or operation of the electronic device 100 or may perform data processing, function or operation related to an application program installed in the electronic device 100 on the basis of the sensing signal. Typical sensors among various sensors that may be included in the sensing unit 140 will be described in more detail.

First, the proximity sensor 141 refers to a sensor that detects the presence of an object approaching a predetermined detection surface or the presence of an object in the vicinity of the detection surface using an electromagnetic force or an infrared ray, without mechanical contact. The proximity sensor 141 may be disposed in an inner region of the electric device which is covered by the touch screen or in proximity to the touch screen.

Examples of the proximity sensor 141 include a transmission type photoelectric sensor, a direct reflection type photoelectric sensor, a mirror reflection type photoelectric sensor, a high-frequency oscillation type proximity sensor, a capacitive proximity sensor, a magnetic proximity sensor, and an infrared proximity sensor. In a case where the touch screen is a capacitive touch screen, the proximity sensor 141 may be configured to detect proximity of the object by a change in an electric field according to the proximity of the object having conductivity. In this case, the touch screen (or touch sensor) itself may be classified as a proximity sensor.

Meanwhile, for the sake of convenience of description, an action in which an object approaches the touch screen without contacting the touch screen may be called a proximity touch, and an action in which an object actually touches the touch screen may be called a contact touch. A location of the touch screen proximity-touched by the object may refer to a position of the object that vertically opposes the touch screen when the object performs the proximity touch. The proximity sensor 141 may detect a proximity touch and a proximity touch pattern (e.g., a proximity touch distance, a proximity touch direction, a proximity touch duration, a proximity touch position, a proximity touch shift state, etc.). The controller 180 may process data (or information) corresponding to the proximity touch action detected through the proximity sensor 141 and the detected proximity touch pattern and output visual information corresponding to the processed data to the touch screen. Further, the controller 180 may control the electronic device 100 to process different operations or data (or information) depending on whether the touch applied to the same point on the touch screen is a proximity touch or a contact touch.

The touch sensor senses a touch (or touch input) applied to the touch screen (or the display unit 151) using at least one of various touch methods such as a resistive type, a capacitive type, an infrared type, an ultrasonic type, and a magnetic field type.

As an example, the touch sensor may be configured to convert pressure applied to a specific portion of the touch screen or a change in capacitance generated in a specific portion into an electrical input signal. The touch sensor may be configured to detect a position at which a touch object applying a touch to the touch screen touches on the touch sensor, an area, a pressure at the time of touch, a capacitance at the time of touch, and the like. Here, the touch object may be a finger, a touch pen, a stylus pen, a pointer, or the like as an object which applies a touch to the touch sensor.

Thus, when there is a touch input to the touch sensor, a corresponding signal(s) is sent to a touch controller. The touch controller processes the signal(s) and then transmits corresponding data to the controller 180. Thus, the controller 180 may know which area of the display unit 151 is touched or the like. Here, the touch controller may be a separate component from the controller 180 or may be the controller 180 itself.

Meanwhile, the controller 180 may perform different controls or perform the same control according to the type of the touch object which touches the touch screen (or a touch key provided on the touch screen). Whether to perform different controls or to perform the same control depending on the type of the touch object may be determined according to a current operation state of the electronic device 100 or an application program being executed.

Meanwhile, the touch sensor and the proximity sensor described above may be used independently or in combination to sense various types of touches such as a short touch (or tap), a long touch, a multi-touch, a drag touch, a flick touch, a pinch-in touch, a pinch-out touch, a swipe touch, a hovering touch, and the like.

The ultrasonic sensor may recognize position information of the object to be sensed using ultrasonic waves. Meanwhile, the controller 180 may calculate a position of a wave generating source through information sensed by an optical sensor and the plurality of ultrasonic sensors. The position of the wave generating source may be calculated using the fact that light is much faster than the ultrasonic wave, that is, a time when light reaches the optical sensor is much faster than a time when the ultrasonic wave reaches the ultrasonic sensor. More specifically, the position of the wave generating source may be calculated using a time difference with the time when the ultrasonic wave reaches based on light as a reference signal.

The camera 121 described as a component of the input unit 120 includes at least one of a camera sensor (e.g., a CCD, a CMOS, etc.), a photo sensor (or an image sensor), and a laser sensor.

The camera 121 and the laser sensor may be combined with each other to sense a touch of the sensing object with respect to a three-dimensional stereoscopic image. A photosensor may be stacked on a display element and may be configured to scan movement of the sensing object proximate to the touch screen. More specifically, the photosensor includes photo diodes and transistors (TRs) in a row/column and scans contents placed on the photosensor using an electrical signal changing according to the amount of light applied to the photo diode. That is, the photo sensor performs coordinate calculation of the sensing object according to variation of light, and position information of the sensing object may be obtained through the calculation.

The display unit 151 displays (outputs) information processed in the electronic device 100. For example, the display unit 151 may display execution screen information of an application program driven in the electronic device 100 or a user interface (UI) or graphic user interface (GUI) information according to the execution screen information.

In addition, the display unit 151 may be configured as a stereoscopic display unit for displaying a stereoscopic image.

The stereoscopic display unit may adopt a three-dimensional display method such as a stereoscopic method (glass method), an autostereoscopic method (glassless method), and a projection method (holographic method).

The audio output unit 152 may output audio data received from the wireless communication unit 110 or stored in the memory 170 in a call signal reception mode, a call mode or a recording mode, a voice recognition mode, and a broadcast reception mode. The audio output unit 152 may also output an audio signal related to a function (e.g., call signal reception sound, message reception sound, etc.) performed in the electronic device 100. The audio output unit 152 may include a receiver, a speaker, a buzzer, and the like.

The haptic module 153 generates various tactile effects that the user may feel. A typical example of the haptic effect generated by the haptic module 153 may be vibration. The intensity and pattern of the vibration generated in the haptic module 153 may be controlled by the user's selection or a setting of the processor. For example, the haptic module 153 may synthesize different vibrations and output the same or sequentially output the vibrations.

In addition to vibration, the haptic module 153 may generate various other tactile effects, including an effect by stimulation such as a pin arrangement vertically moving to a contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to a particular configuration of the electric device.

The light output unit 154 outputs a signal for notifying the occurrence of an event using light of a light source of the electronic device 100. Examples of events that occur in the electronic device 100 may include message reception, call signal reception, an absent call, alarm, schedule notification, e-mail reception, information reception through an application, and the like.

The signal output by the light output unit 154 is implemented when the electric device emits light of a single color or a plurality of colors to the front or rear surface. The signal output may be terminated as the electric device detects that the user checks the event.

The interface unit 160 serves as an interface for communication with all external devices connected to the electronic device 100. The interface unit 160 receives data or power from an external device and transmits the data to each component in the electronic device 100 or allows data in the electronic device 100 to be transmitted to an external device. For example, a wired/wireless headset port, an external charger port, a wired/wireless data port, a memory card port, a port connecting a device having an identification module, an audio input/output (I/O) port, a video I/O port, an earphone port, and the like may be included in the interface unit 160.

Meanwhile, the identification module may include a user identification module (UIM), a subscriber identity module (SIM), a universal subscriber identity module (USIM), and the like, as a chip storing various information for authenticating authority to use the electronic device 100. A device including the identification module (hereinafter referred to as "identification device") may be manufactured in a smart card form. Accordingly, the identification device may be connected to the electronic device 1000 through the interface unit 160.

When the electronic device 100 is connected with an external cradle, the interface unit 160 may serve as an interface to allow power from the cradle to be supplied to the electronic device 100 or may serve as an interface to allow various command signals input by the user from the cradle to be transferred to the electronic device 100 therethrough. Various command signals or power input from the cradle may operate as signals for recognizing that the electronic device 100 is properly mounted on the cradle.

The memory 170 may store a program for the operation of the controller 180 and temporarily store input/output data (e.g., a phone book, a message, a still image, a moving picture, etc.). The memory 170 may store data related to vibration and sound of various patterns output when a touch is input on the touch screen.

The memory 170 may include at least one of a flash memory type, a hard disk type, a solid state disk type, a silicon disk drive (SDD) type, a multimedia card micro type, a card type memory (e.g., SD or XD memory, etc.), a random access memory (RAM), static random access memory (SRAM), read-only memory (ROM), an electrically erasable programmable read-only memory (EEPROM), programmable read-only memory (PROM), magnetic memory, magnetic disk, and optical disk. The electronic device 100 may be operated in association with a web storage that performs a storage function of the memory 170 on the internet.

Meanwhile, as described above, the controller 180 controls an operation related to an application program and an overall operation of the electronic device 100. For example, the controller 180 may execute or release a lock state that restricts input of a user's control command for applications if a state of the electric device meets a set condition.

In addition, the controller 180 may perform control and processing related to a voice call, data communication, video call, and the like, or perform pattern recognition that recognizes handwriting input or drawing input performed on the touch screen as characters and images. Further, the controller 180 may control any one or a combination of a plurality of the above-described components in order to implement various embodiments described below on the electronic device 100 according to the present disclosure.

The power supply unit 190 receives external power and internal power and supplies power required for an operation of each component under the control of the controller 180. The power supply unit 190 includes a battery, the battery may be an internal battery configured to be chargeable or may be detachably coupled to the electric device body for charging or the like.

In addition, the power supply unit 190 may include a connection port, and the connection port may be configured as an example of the interface 160 in which an external charger for supplying power is electrically connected to charge the battery.

As another example, the power supply unit 190 may be configured to charge the battery in a wireless manner without using the connection port. In this case, the power supply unit 190 may receive power using at least one of an inductive coupling method based on a magnetic induction phenomenon from an external wireless power transmission device and a magnetic resonance coupling method based on an electromagnetic resonance phenomenon. In the present disclosure, the electronic device 100 may be referred to as a terminal.

Figure 5:
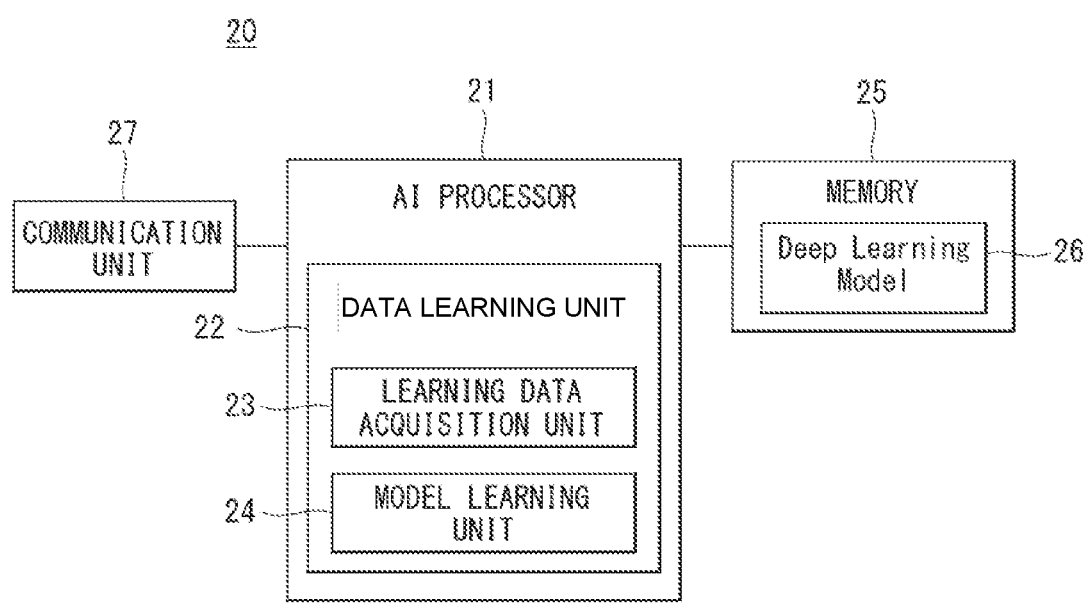
FIG. 5 is a block diagram of an artificial intelligence (AI) device according to an embodiment of the present disclosure.

FIG. 5 is a block diagram of an artificial intelligence (AI) device according to an embodiment of the present disclosure.

The AI device 20 may include an electronic device including an AI module capable of performing AI processing or a server including the AI module. Further, the AI device 20 may be included as at least a part of the electronic device 100 shown in FIG. 4 and may be provided to perform at least part of the AI processing together.

The AI device 20 may include an AI processor 21, a memory 25, and/or a communication unit 27.

The AI device 20 is a computing device capable of learning a neural network and may be implemented as various electronic devices such as a server, a desktop PC, a notebook PC, a tablet PC, or the like.

The AI processor 21 may learn neural networks using programs stored in the memory 25. Specifically, the AI processor 21 may learn neural networks for recognizing vehicle-related data. Here, neural networks for recognizing vehicle-related data may be designed to simulate the structure of the human brain on a computer, and include multiple weighted network nodes that simulate the neurons of the human neural network. Multiple network modes may send and receive data according to each connection relationship to simulate the synaptic activity of a neuron sending and receiving signals through a synapse. Here, neural networks may include deep learning models developed from neural network models. In the deep-learning model, multiple network nodes are located in different layers and may send and receive data according to the convolution connection relationship. Examples of neural network models include deep neural networks (DNNs), convolutional deep neural networks (CNNs), Recurrent neural networks (RNNs), Restricted Boltzmann Machine (RBM), deep belief networks (DBNs), Deep Q-Network and the like, and may be applied to fields such as computer vision, voice recognition, natural language processing, voice/signal processing and the like.

Meanwhile, processors that perform the above-described functions may be general processors (e.g., CPU), but they may be AI-only processors (e.g., GPU) for artificial intelligence learning.

The memory 25 may store various programs and data that are needed for operation of the AI apparatus 20. The memory 25 may be embodied by nonvolatile memory, volatile memory, flash-memory, hard disk drive (HDD), solid state drive (SDD) or the like. The memory 25 may be accessed by the AI processor 21, and data may be read/recorded/modified/deleted/renewed by the AI processor 21. Further, the memory 25 may store neural network models (e.g., the deep learning model 26) generated via learning algorithms for data classification/recognition according to an example of this disclosure.

Meanwhile, the AI processor 21 may include a data learning unit 22 that learns the neural network for data classification/recognition. The data learning unit (22) may learn the criteria for which learning data is used to determine data classification/recognition and how data is classified and recognized using learning data. The data learning unit 22 may learn the deep learning model by obtaining the learning data to be used for learning and applying the obtained learning data to the deep learning model.

The data learning unit 22 may be manufactured in the form of at least one hardware chip and may be mounted on AI apparatus 20. For example, the data learning unit, 22 may be manufactured in the form of a dedicated hardware chip for artificial intelligence (AI), or manufactured as a part of a general processor (CPU) or a graphics-only processor (GPU) and be mounted on an AI apparatus 20. Further, the data learning unit 22 may be embodied by a software module. If embodied by a software module (or a program module containing instructions), the software module may be stored in a non-transitory readable recording media which may be read by computer. In this case, at least one software module may be provided by an operating system (OS) or by an application.

The data learning unit 22 may include the learning data acquisition unit 23 and the model learning unit 24.

The learning data acquisition unit 23 may obtain the learning data needed for neural network models to classify and recognize the data. For example, the learning data acquisition unit 23 is learning data, which may be obtained from vehicle data and/or sample data for input into the neural network model.

Using the above obtained learning data, the model learning unit 24 may learn to allow a neural network model to have criteria for determining how to classify predetermined data. At this time, the model learning unit 24 may make the neural network model learn via a supervised learning which uses at least some of the learning data as a basis for judgment. Alternatively, the model learning unit 24 may learn by itself using learning data without supervision, so that the neural network model is made learn via unsupervised learning which discovers judgment criteria. Further, the model learning unit 24 may make the neural network model learn via reinforcement learning by using feedback on whether the results of learning-based situational judgments are correct. Further, the model learning unit (24) may make a neural network model learn using learning algorithms that include error back-propagation or gradient descent.

Once the neural network model is learned, the model learning unit 24 may store the learned neural network model in a memory. The model learning unit 24 may store the learned neural network model in a memory of servers connected by a wired or wireless network with the AI apparatus 20.

The data learning unit 22 may further include a learning data preprocessing unit (not shown) and a learning data selecting unit (not shown) to improve the analysis results of the recognition model or to save time or resources required to create the recognition model.

The learning data preprocessing unit may preprocess the obtained data so that the obtained data may be used for learning for situation determination. For example, the learning data preprocessing unit may process the obtained data in the previously established format so that the model learning unit 24 may use the obtained learning data for learning for image recognition.

Further, the learning data selecting unit may select data necessary for learning from the learning data obtained in the learning data acquisition unit 23 and the learning data preprocessed in the pre-processing unit. Selected learning data may be provided to the model learning unit 24. For example, the learning data selecting unit may select data only for objects in a specific area by detecting specific areas of the image obtained through the vehicle's camera.

Further, the data learning unit 22 may further include a model evaluation unit (not shown) to improve the analysis results of the neural network model.

The model evaluation unit may make the model learning unit 22 learn again if the evaluation data is input into the neural network model and the analysis result output from the evaluation data does not meet the predetermined standard. In this case, the evaluation data may be data which have been already defined for evaluating the recognition model. For example, the model evaluation unit may evaluate that if the number or percentage of the evaluation data whose analysis result is not correct among the analysis results of the learned recognition model for the evaluation data, exceeds predetermined threshold, it does not meet the predetermined standard.

The communication unit 27 may transmit AI processing results by the AI processor 21 to external electronic devices.

Here, the external electronic device may be defined as an autonomous vehicle. Further, the AI device 20 may be defined as another vehicle or 5G network that communicates with the autonomous vehicle. Meanwhile, the AI device 20 may be functionally embedded and implemented in an autonomous driving module provided in the vehicle. Further, the 5G network may include a server or a module that performs control related to autonomous driving. Further, the AI device 20 may be implemented through a home server.

Meanwhile, the AI device 20 illustrated in FIG. 5 are functionally divided into an AI processor 21, a memory 25, a communication unit 27, and the like, but these components may be integrated into one module which is called an AI module.

Deep Neural Network (DNN) Model

Figure 6:
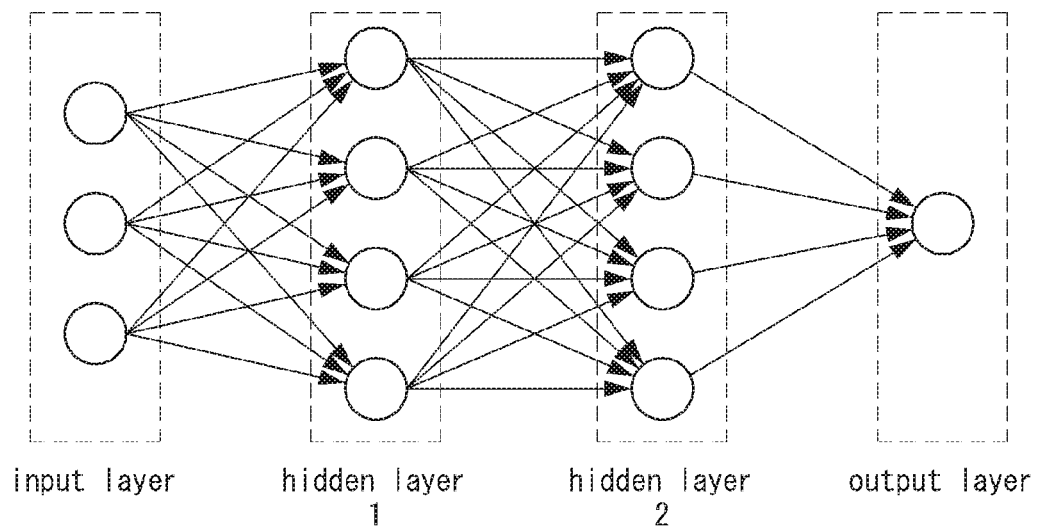
FIG. 6 shows an example of a DNN model to which the present disclosure may be applied.

FIG. 6 shows an example of a DNN model to which the present disclosure may be applied.

The Deep Neural Network (DNN) is an artificial Neural Network (ANN) formed with several hidden layers between an input layer and an output layer. The Deep Neural Networks may model complex non-linear relationships, as in a typical artificial neural networks.

For example, in the deep neural network structure for an object identification model, each object may be represented by a hierarchical configuration of the image basic elements. At this time, the additional layers may aggregate the characteristics of the gradually gathered lower layers. This feature of deep neural networks allows more complex data to be modeled with fewer units (nodes) than similarly performed artificial neural networks.

As the number of hidden layers increases, the artificial neural network is called "deep," and machine learning paradigm that uses such a sufficiently deepened artificial neural network as a learning model is called deep learning. And, the sufficiently deep artificial neural network used for such deep learning is commonly referred to as the Deep Neural network (DNN).

In the present disclosure, data required for training an optical character recognition (OCR) model may be input to the input layer of the DNN, and meaningful data that may be used by the user may be generated through the output layer, while passing through the hidden layers.

In the specification of the present disclosure, the artificial neural network (ANN) used for such a deep learning method is collectively referred to as DNN, but any other type deep learning method may also be applied if it is able to output meaningful data.

Deep Learning-Based OCR Model

Figure 7:
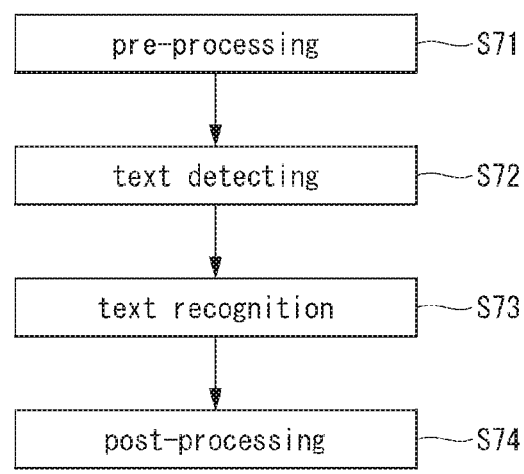
FIG. 7 shows an example of an optical character recognition (OCR) model to which the present disclosure may be applied.

FIG. 7 shows an example of an OCR model to which the present disclosure may be applied.

The OCR model is an automatic recognition technology that converts text and images on printed or captured images into digital data. Examples of using the technology include recognition of text of business cards or handwriting information on papers. The related art OCR model operates as a subdivided module such as a module for finding a text line and a module for splitting letters (i.e., characters). Features that recognize different patterns of these characters must to be designed by a developer. Further, the OCR model limitedly operate only in high quality images.

In recent years, the field of OCR has improved in accuracy by applying deep learning, and it generates rules (feature extraction) that recognizes text in images through massive data learning on its own. The following is an example of an OCR model using the deep learning technology.

S71: Pre-Processing

Computers may recognize pixels having similar brightness values as a chunk, and more easily detect a letter having a color different from the periphery and having a different structure or point of continuity. Thus, a recognition rate may be significantly improved through pre-processing.

An example of such pre-processing is as follows. A low-color image is converted into grayscale. Subsequently, histogram equalization is performed. A sharper image may be obtained by maximizing contrast by redistributing a brightness distribution of the image. However, there is still a limitation in clearly distinguishing between a background and a letter. To solve this problem, binarization is performed. If a pixel value is 255 (white), it is changed to '0', and if it is 0 to 254 (gray and black), it is changed to '1'. As a result, the background and the letter may be separated more clearly.

S72: Text Detecting

After the image is put into the DNN, feature values are obtained. The data to be obtained is a text area (text box) and a rotation angle of the text box. Picking out the text area from the input image may reduce unnecessary computation. Rotation information is used to make the tilted text area horizontal. Thereafter, the image is cut into text units. Through this step, an individual character image or word image may be obtained.

S73: Text Recognition

In order to recognize which letter each image contains, a DNN is used. The DNN learns how to recognize individual words and letters in the form of images. Meanwhile, the types of words or strings that the DNN may recognize vary by languages. Therefore, for general-purpose OCR, a module for estimating language using only images may be necessary.

S74: Post-Processing

OCR post-processes character recognition errors in a similar way that humans accept text. There are two ways. The first is to use features of each letter. An error is corrected by distinguishing between similar letters (similar pairs) such as "일/밀", "양/양", and "파/따". The second way is to use contextual information. To this end, a language model or a dictionary may be necessary, and a language model that learns numerous text data on the web may be constructed through deep learning.

The present disclosure is to apply an existing deep learning-based OCR model in a more advanced form through federated learning (to be described later).

Text of a business card may be recognized through the camera of the terminal, the above-described deep learning-based OCR model may be used to store the text of the business card. To train the OCR model, a large amount of labeled training data is required. However, even with the OCR model trained with a large amount of data, an error inevitably occurs when new data is input in an actual use environment.

In the training method of the OCR model proposed in the present disclosure, the data generated through an inference error of the model is obtained directly from an edge device, which is an environment in which the actual model is used, and then learned, a result of the learning is transmitted to a model averaging server and merged to create a better OCR model, and thereafter, the model is transmitted to each edge-device.

Federated Learning

Figure 8:
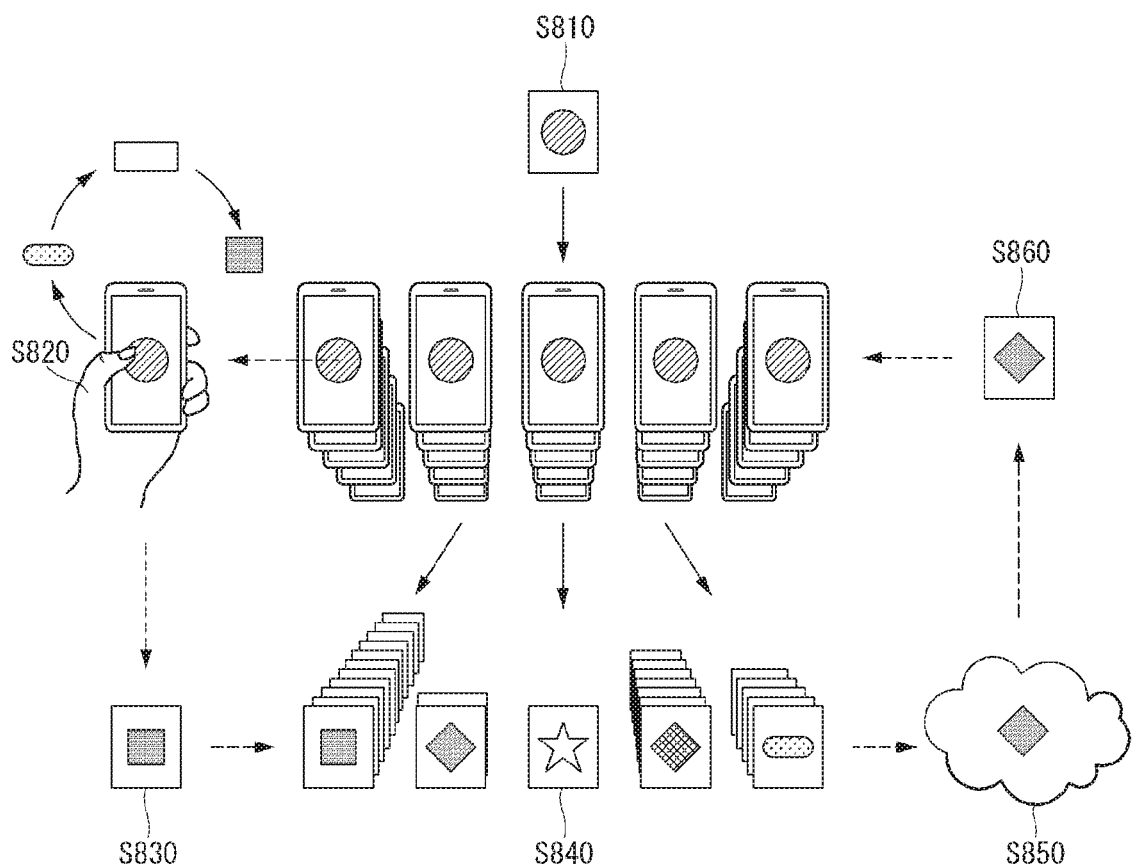
FIG. 8 shows an example of a federated learning technique to which the present disclosure may be applied.

FIG. 8 shows an example of a federated learning technology to which the present disclosure may be applied.

In the case of user federated learning, learning may be commonly performed using a common prediction model, while the terminal manages the predictive data, and thus, there is no need to store the data in a separate server or cloud.

To this end, all terminals download the current common prediction model (S810). The terminal improves learning of the prediction model on the basis of data of the terminal according to the use of the user (S820). After improving learning of the prediction model, the terminal may generate a change as update data (S830). Numerous prediction models of the terminal may be learned by reflecting various usage environments and characteristics of the user (S840). The update data of each terminal may be transmitted to a cloud server through communication and may be used to improve a common prediction model (S850). The improved common prediction model may be distributed again to each terminal (S860). The terminal may re-learn the prediction model, and the common prediction model may be improved repeatedly so as to be advanced and shared.

This is different from the existing OCR model learning method. Since data of the user is not collected directly, the problem of personal information leakage does not occur. Actual use data, not data collected in a certain environment. Is used for model learning. Further, since the user directly induce data labeling, there is no additional cost for data acquisition, and since model learning occurs in a device of each user, a separate learning server is not necessary. Further, since raw data of an individual is not transmitted to the server and only weights as a collection of float numbers which are deformed results are collected, the problem of personal information leakage is solved.

Figure 9:
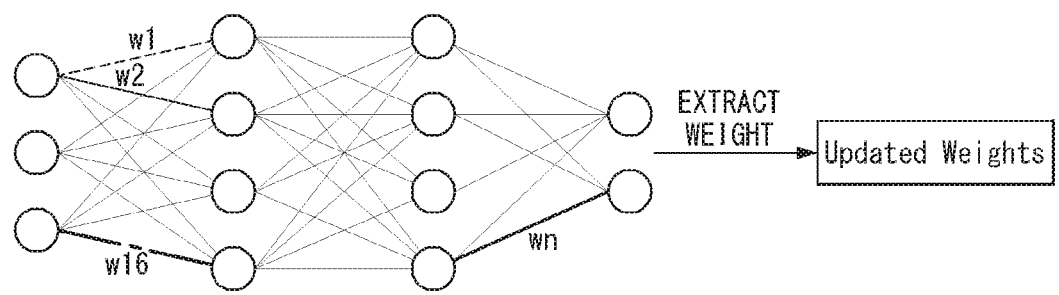
FIG. 9 is an example of weights to which the present disclosure may be applied.

FIG. 9 shows an example of weights to which the present disclosure may be applied.

A weight refers to a set of variables that may be learned using a neural network of deep learning. In order to improve the common prediction model, update data of each terminal may be generated in the form of a weight. Through the prediction model of each terminal, the generated weight may be represented as, for example, W=[w1, w2, . . . , wn]. The weight may be uploaded to the server and used to improve the common prediction model.

Figure 10:
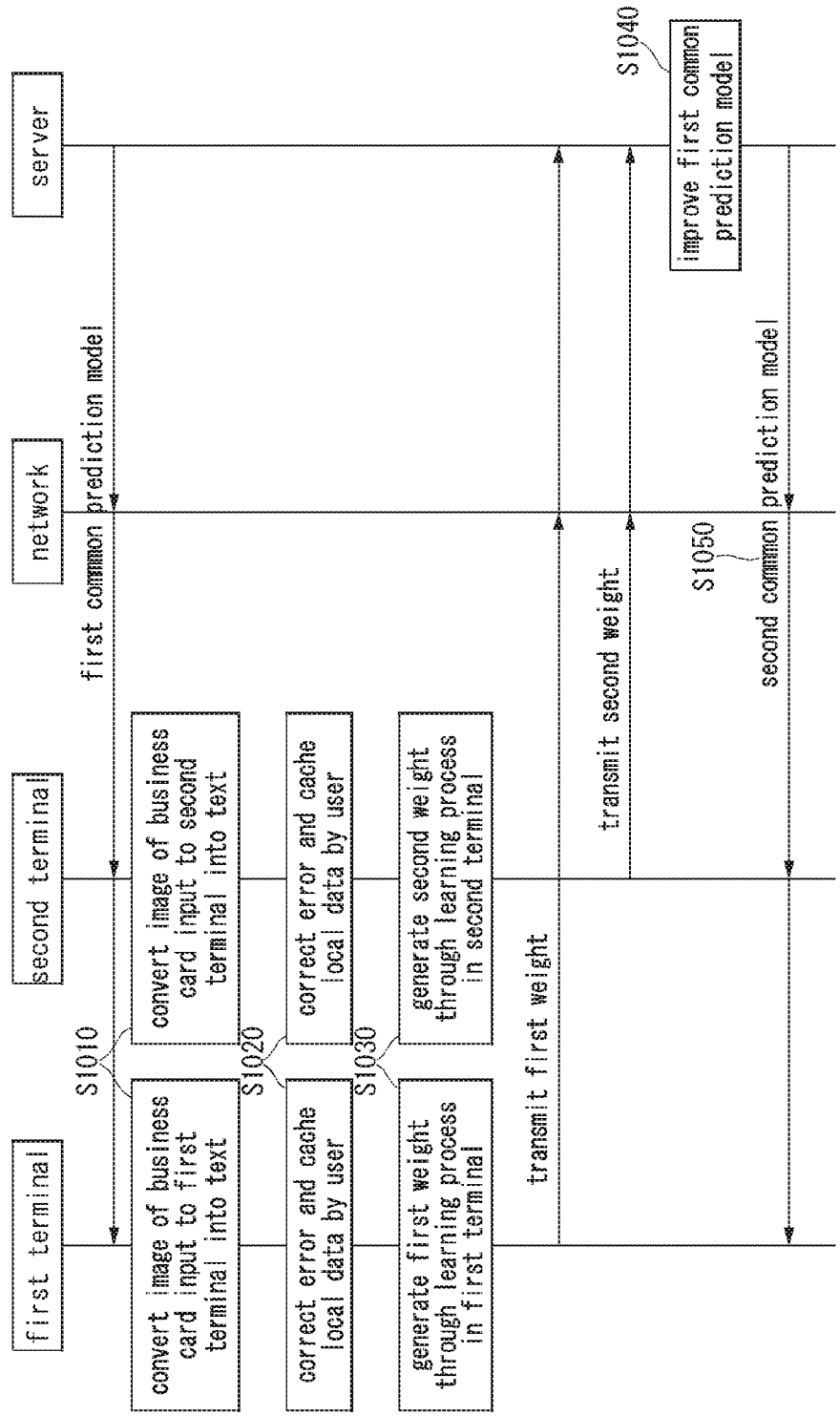
FIG. 10 is an embodiment to which the present disclosure may be applied.

FIG. 10 is an embodiment to which the present disclosure may be applied.

The overall learning process of the present disclosure include five steps as described below, for example. When the first to fifth steps are performed once, it is called 1 round, and the OCR model may be improved by learning by repeating each round.

S1010: Converting Image of Business Card into Text

Each terminal downloads a first common prediction model from a server. Each terminal converts an input image of a business card into text using the received first common prediction model.

Figure 11:
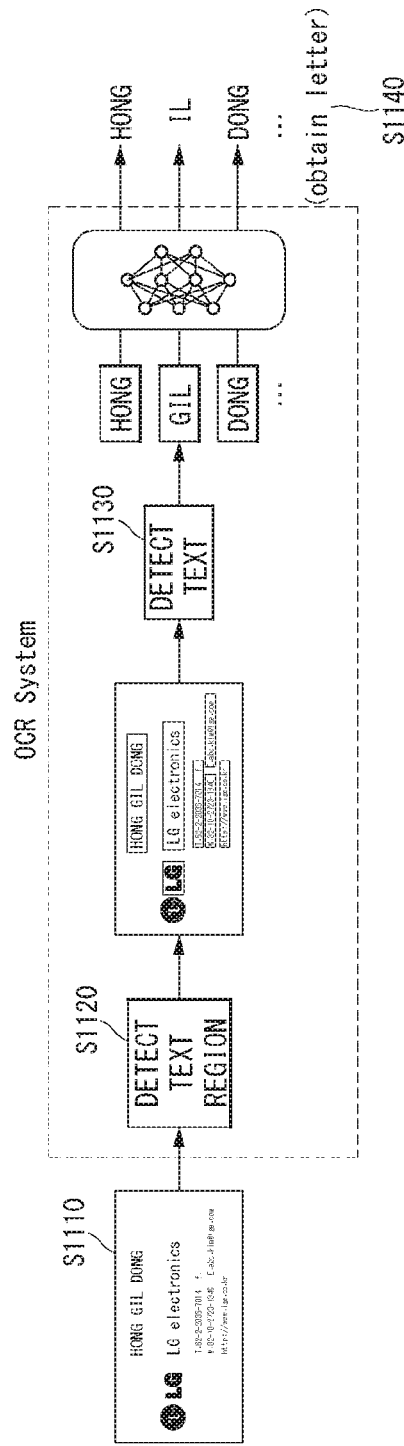
FIG. 11 shows an example of a method of converting a business card image into text to which the present disclosure may be applied.

FIG. 11 shows an example of a method of converting an image of a business card into text to which the present disclosure may be applied.

The terminal obtains an image of a business card for which text information is desired to be obtained (S1110). To this end, the user may use the camera of the terminal.

The terminal separates a background and text area from the image of the business card (S1120).

The terminal uses a character recognition inference model to recognize which letter the cropped image including the text area includes (S1130). Such a character recognition model may be implemented using a DNN in a deep learning manner.

Each terminal shares the same character recognition model through a common prediction model received from the server. The DNN may obtain a feature value from the text area and obtain an individual letter using the feature value as an input value (S1140).

A text conversion process of the obtained individual letters based on the general character recognition inference model is terminated here, and if an inference error occurs as in step S1140, there is no way to improve the problem by itself.

S1020: Error Correction and Local Data Caching by User

In the present disclosure, error data may be naturally labeled in the process of checking a result of the character recognition inference by the user and learned in each terminal, and thereafter, the common prediction model may be improved through federated learning. The improved common prediction model may be downloaded to all the terminals again, and this process may be repeated to continuously improve performance of the common prediction model.

Figure 12:
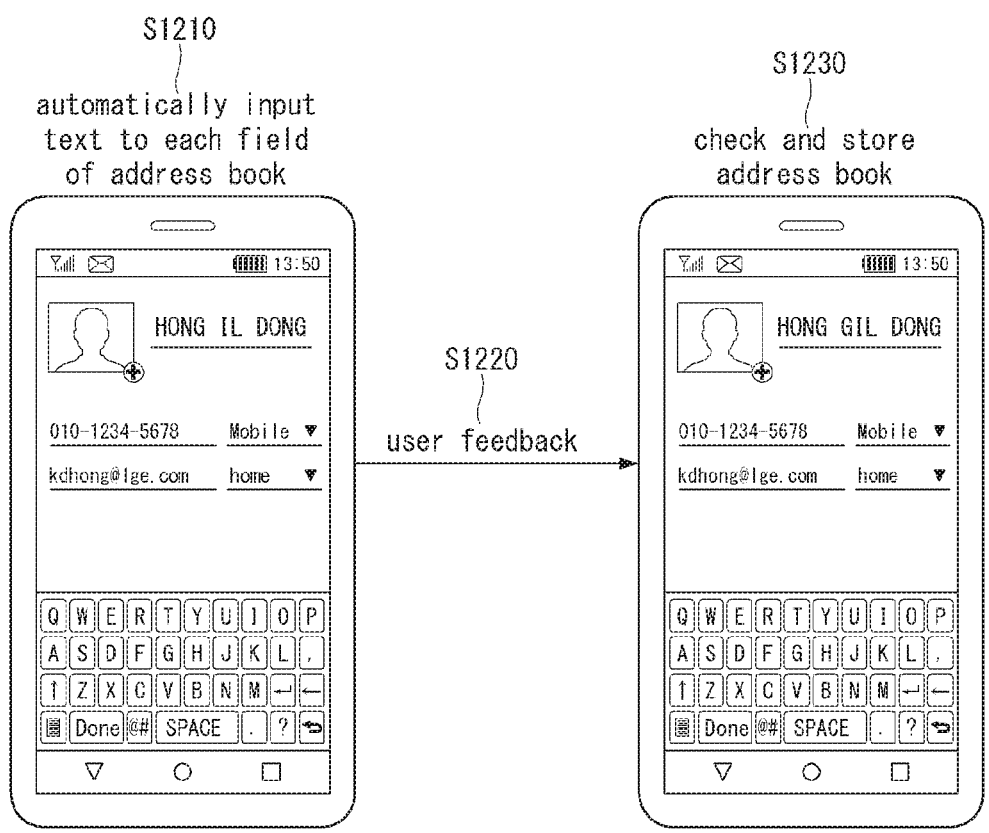
FIG. 12 is an example of error correction and local data caching to which the present disclosure may be applied.

FIG. 12 shows an example of error correction and local data caching to which the present disclosure may be applied.

The terminal may automatically input text match to each field of an address book by analyzing a pattern regarding obtained letters (S1210). As for the pattern analysis, for example, in the case of a business card used in South Korea, a telephone number field includes a combination of six or more numbers and has characteristics that a form thereof does not deviate from a certain range. However, there is a possibility of confusion with a postal code or an address part as an address field. The address field has characteristics that it includes suffixes such as city, county, borough, town, subdivision of town, and village. A name field has characteristics that it has 279 surnames of 2 to 5 letters. Further, names of kanji includes 447 combinations of Hangul based on pronunciation. Title and department fields are adjacent to each other, also adjacent to the name field, and have a suffix. E-mail and web address fields contain primary and secondary domain names and have a combination of alphanumeric characters. Also, an e-mail includes '@'. A company name field has characteristics of using the boldest font in the business card and a suffix or prefix of Co., Ltd. Such patterns may be defined to be different according to the purpose of making a business card, a used language, a used country, and the like. The user may recognize that an error occurs through an address book screen.

The user may delete a letter with an error and correct it to a proper letter (S1220). Correct letter data and error letter data may be labeled together in the aforementioned text area and stored in a local cache. Through this, not only correct letters but also error letters may be used to train the character recognition model.

The user may store the error-corrected text in each field of the address book of the terminal (S1230).

Through feedback of the user, each terminal may obtain data for learning by itself, and such data may have variety according to a usage environment of each terminal.

S1030: Learning process in terminal

Figure 13:
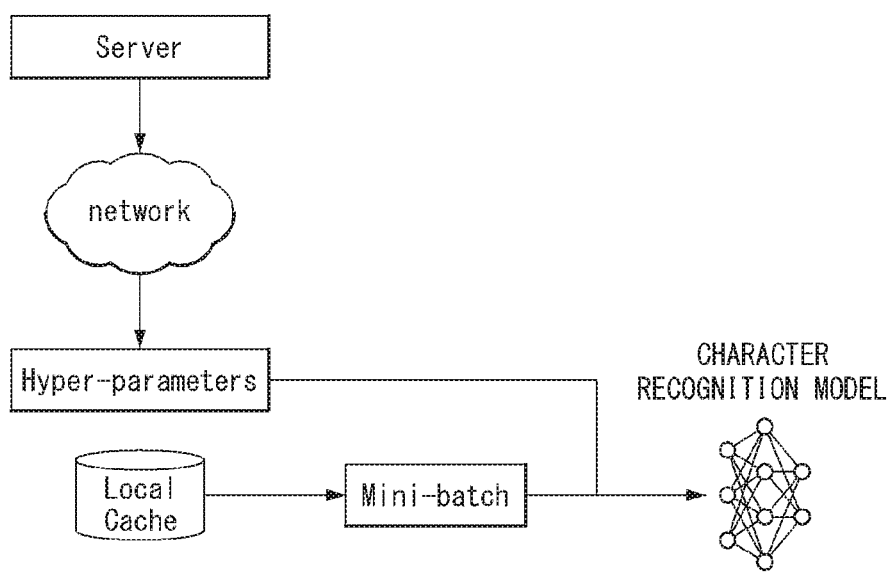
FIG. 13 shows an example of a learning process in a terminal to which the present disclosure may be applied.

FIG. 13 shows an example of a learning process in a terminal to which the present disclosure may be applied.

The terminal trains the character recognition model using data cached under a specific condition. An example of the specific condition may include a state where the terminal is being charged, a state where the terminal is connected to Wi-Fi, and a state where terminal is in an idle mode. Through this, the terminal may perform the learning process without affecting an operation of a main processor or without using the mobile communication technology which is billed.

A hyper-parameter used for training the character recognition model may be received from the server every round and used. The learning may be performed by updating a weight-parameter of the character recognition model of the terminal. When the learning is completed, the weight-parameter of the character recognition model is uploaded to the server and the data used for the learning is deleted from the cache of the terminal.

S1040: Improvement of common prediction model

Figure 14:
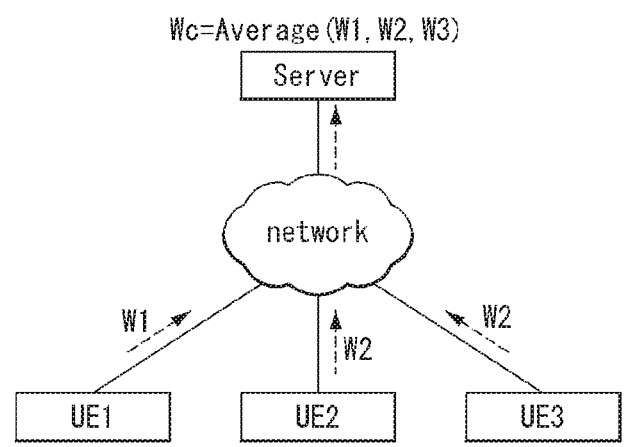
FIG. 14 shows an example of a method for improving a common prediction model to which the present disclosure may be applied.

FIG. 14 shows an example of a method for improving a common prediction model to which the present disclosure may be applied.

Each terminal transmits a weight-parameter to the server. The server may train the common prediction model when the received weight-parameters reaches a predetermined number or greater. The common prediction model may be trained using an average of the weight-parameters received from each terminal.

S1050: Distribution of the trained common prediction model

Figure 15:
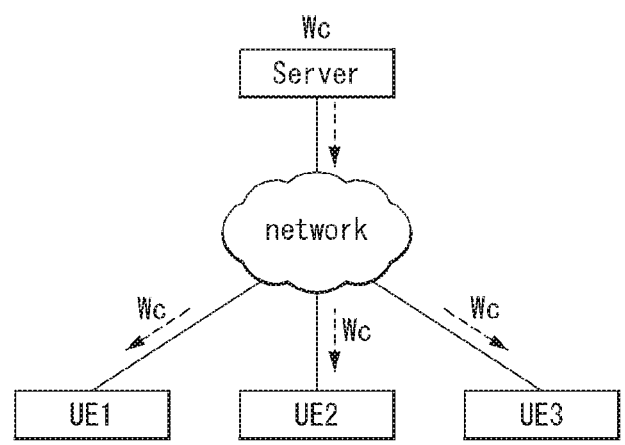
FIG. 15 shows an example of distribution of a common prediction model to which the present disclosure may be applied.

FIG. 15 shows an example of distribution of a common prediction model to which the present disclosure may be applied.

When the common prediction model is trained and updated, the server distributes the common prediction model to each terminal. This may be done by the user's permission through an update notification message of the terminal or may be automatically distributed when it is determined that the terminal corresponds to the specific condition presented in step 3. To this end, the server may transmit weight-parameters having an average value of the weight-parameters used for learning to each terminal, and each terminal may use the weight-parameter for learning.

General Device to which the Present Disclosure May be Applied

Figure 16:
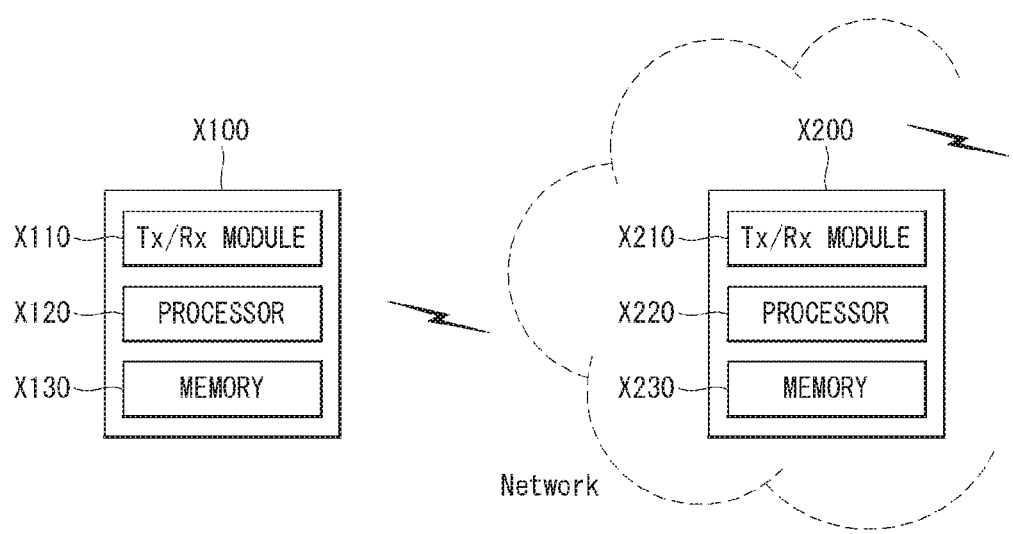
FIG. 16 shows an example of a general device to which the present disclosure may be applied.

Referring to FIG. 16, a server X200 according to a proposed embodiment may include a communication module X210, a processor X220, and a memory X230. The communication module X210 may also be referred to as a radio frequency (RF) unit. The communication module X210 may be configured to transmit various signals, data, and information to an external device and to receive various signals, data, and information from an external device. The server X200 may be connected to the external device by wire and/or wirelessly. The communication module X210 may be separated into a transmitter and a receiver. The processor X220 may control an overall operation of the server X200, and the server X200 may be configured to perform a function of computing and processing information to be transmitted to and received from the external device. Further, the processor X220 may be configured to perform a server operation proposed in the present disclosure. The processor X220 may control the communication module X110 to transmit data or a message to the UE, another vehicle, or another server according to the proposal of the present disclosure. The memory X230 may store the processed information and the like for a predetermined time and may be replaced with a component such as a buffer.

Further, the specific configuration of the terminal device X100 and the server X200 as described above may be implemented such that the details described in various embodiments of the present disclosure described above are applied independently or two or more embodiments are applied at the same time, and redundant contents are omitted for clarity.

Embodiment 1

A method of recognizing a business card of a terminal through federated learning, includes: receiving an image of the business card; extracting a feature value from the image including text related to a field of an address book set in the terminal; inputting the feature value into a first common prediction model and determining first text information from an output of the first common prediction model; analyzing a pattern of the first text information and inputting the first text information into the field; caching the first text information and second text information received for error correction of the first text information from a user; and training the first common prediction model using the image, the first text information, and the second text information, wherein the first common prediction model is received through a server and the first text information indicates text which can be mapped by the image.

Embodiment 2

In embodiment 1,
the training of the first common prediction model includes: updating a weight-parameter of the first common prediction model using a hyper-parameter received from the server.

Embodiment 3

In embodiment 2,
the method further includes: deleting the first text information and the second text information; transmitting the weight-parameter to the server; and applying a second common prediction model received from the server, wherein the second common prediction model is a model obtained by training the first common prediction model by the server using the weight-parameter received from at least one terminal.

Embodiment 4

In embodiment 1,
the second text information includes correct answer text input by the user through an input area of the terminal based on the first text information input to the field, which is recognized by the user through an output screen of the terminal.

Embodiment 5

In embodiment 3,
the applying of the second common prediction model includes training the first common prediction model using a weight-parameter extracted from the second common prediction model.

Embodiment 6

In embodiment 1,
the method further includes: updating the field on the basis of the second text information.

Embodiment 7

In embodiment 1,
the training of the first common prediction model is performed when a condition set in the terminal is satisfied, and the condition includes a state where the terminal is being charged, a state where the terminal is connected to Wi-Fi, or a state where the terminal is in an idle mode.

Embodiment 8

In embodiment 3,
the applying of the second common prediction model is performed when a condition set in the terminal is satisfied, and the condition includes a state where permission of the user is input as a response to an update notification message output on the screen of the terminal, a state where the terminal is being charged, a state where the terminal is connected to Wi-Fi, or a state where the terminal is in an idle mode.

Embodiment 9

In embodiment 3,
the second common prediction model is a model obtained by training the first common prediction model when the weight-parameters of a certain number or greater set by the server are received.

Embodiment 10

A method for recognizing a business card of a server through federated learning includes: transmitting a first common prediction model for recognizing text from an image of a business card received by a terminal; transmitting, by the terminal, a hyper-parameter for training the first common prediction model; receiving a weight-parameter from the terminal; and training the first common prediction model using the weight-parameter, wherein the first common prediction model is transmitted to one or more of the terminal.

Embodiment 11

In embodiment 10,
the method further includes: transmitting a second common prediction model to the terminal, wherein the second common prediction model is obtained by training the first common prediction model using the weight-parameter.

Embodiment 12

In embodiment 10,
the training of the first common prediction model is performed when the weight-parameters of a certain number or greater are received.

Embodiment 13

In embodiment 11,
the transmitting of the second common prediction model includes transmitting a weight-parameter extracted from the second common prediction model.

Embodiment 14

In embodiment 13,
the transmitting of the second common prediction model to the terminal is performed when a condition set in the terminal is satisfied, and the condition includes a state where the terminal is being charged, a state where the terminal is connected to Wi-Fi, or a state where the terminal is in an idle mode.

Embodiment 15

A terminal for performing a method for recognizing a business card through federated learning includes: a communication module; a memory; a display unit; and a processor, wherein the processor receives an image of the business card, extracts a feature value from the image including text related to a field of an address book set in the terminal, inputs the feature value into a first common prediction model, determines first text information from an output of the first common prediction model, analyzes a pattern of the first text information, inputs the first text information into the field, caches the first text information and second text information received for error correction of the first text information from a user, and trains the first common prediction model using the image, the first text information, and the second text information, wherein the first common prediction model is received through a server and the first text information indicates text which can be mapped by the image.

Embodiment 16

In embodiment 15,
the processor updates a weight-parameter of the first common prediction model using a hyper-parameter received from the server through the communication module to train the first common prediction model.

Embodiment 17

In embodiment 16,
the processor deletes the first text information and the second text information, transmits the weight-parameter to the server through the communication module, and applies a second common prediction model received from the server, and the second common prediction model is a model obtained by training the first common prediction model by the server using the weight-parameter received from at least one terminal.

Embodiment 18

In embodiment 15,
the second text information comprises correct answer text input by the user through an input area of the terminal based on the first text information input to the field, which is recognized by the user through the display unit.

Embodiment 19

In embodiment 17,
the processor trains the first common prediction model using a weight-parameter extracted from the second common prediction model to apply the second common prediction model.

Embodiment 20

In embodiment 15,
the processor updates the field stored in the memory on the basis of the second text information.

Embodiment 21

In embodiment 15,
The processor trains the first common prediction model when a condition set in the terminal is satisfied, and the condition includes a state where the terminal is being charged, a state where the terminal is connected to Wi-Fi, or a state where the terminal is in an idle mode.

Embodiment 22

In embodiment 17,
the processor applies the second common prediction model when a condition set in the terminal is satisfied, and the condition includes a state where permission of the user is input as a response to an update notification message output on the screen of the terminal, a state where the terminal is being charged, a state where the terminal is connected to Wi-Fi, or a state where the terminal is in an idle mode.

Embodiment 23

In embodiment 17,
the second common prediction model is a model obtained by training the first common prediction model when the weight-parameters of a certain number or greater set by the server are received.

The disclosure described above may be embodied as a computer-readable code in a medium in which program is recorded. A computer-readable medium includes all kinds of recorders where
data that may be read by a computer system is stored. Examples of computer-readable media are hard disk drives (HDDs), solid state disks (SSDs), Silicon disk drives (SDDs), ROMs, RAMs, CD-ROMs, magnetic tape, floppy disks, optical data storage devices, and the like, and include implementation in the form of carrier waves (e.g., transmission over the Internet). Therefore, the detailed description above should not be interpreted in a limited way but should be considered as an example. The scope of the invention shall be determined by a reasonable interpretation of the claims attached, and all changes within the equivalent range of the invention are within the scope of the invention.

Further, in the above examples of service and implementation are described mainly, but these are only examples and do not limit the invention, and a person having an ordinary skill in the art to which the invention belongs are able to know a number of variations and applications not exemplified above are possible without departing from the essential characteristics of the service and implementation example. For example, each component specified in the implementation example may be modified to perform. And, these variants and their application-related differences should be interpreted as being within the scope of the invention as defined in the claims attached.

The present disclosure has been described on the basis of the example applied to a terminal (UE) based on a 5G system but may also be applied to various wireless communication systems and autonomous driving apparatuses.

According to an embodiment of the present disclosure, the terminal may provide a method for recognizing text of a business card.

Further, according to an embodiment of the present disclosure, each terminal may obtain learning data through a feedback operation of a user and a model in each terminal may be trained using the obtained learning data.

What is claimed is:

1. A method of recognizing a business card by a terminal through federated learning, the method comprising:
   receiving an image of the business card;
   extracting a feature value from the image including text related to a field of an address book set in the terminal;
   inputting the feature value into a first common prediction model and determining first text information from an output of the first common prediction model;
   analyzing a pattern of the first text information and inputting the first text information into the field;
   caching the first text information and second text information received for error correction of the first text information from a user; and
   training the first common prediction model using the image, the first text information, and the second text information,
   wherein the first common prediction model is received through a server and the first text information indicates text which can be mapped by the image.

2. The method of claim 1, wherein
   the training of the first common prediction model comprises updating a weight-parameter of the first common prediction model using a hyper-parameter received from the server.

3. The method of claim 2, further comprising:
   deleting the first text information and the second text information; transmitting the weight-parameter to the server; and
   applying a second common prediction model received from the server,
   wherein the second common prediction model is a model obtained by training the first common prediction model by the server using the weight-parameter received from one or more terminals.

4. The method of claim 1, wherein
   the second text information comprises correct answer text input by the user through an input area of the terminal based on the first text information input to the field, which is recognized by the user through an output screen of the terminal.

5. The method of claim 3, wherein
   the applying of the second common prediction model comprises training the first common prediction model using a weight-parameter extracted from the second common prediction model.

6. The method of claim 1, further comprising:
   updating the field on the basis of the second text information.

7. The method of claim 1, wherein
   the training of the first common prediction model is performed when a condition set in the terminal is satisfied, and
   the condition comprises a state where the terminal is being charged, a state where the terminal is connected to Wi-Fi, or a state where the terminal is in an idle mode.

8. The method of claim 3, wherein
   the applying of the second common prediction model is performed when a condition set in the terminal is satisfied, and
   the condition comprises a state where permission of the user is input as a response to an update notification message output on a screen of the terminal, a state where the terminal is being charged, a state where the terminal is connected to Wi-Fi, or a state where the terminal is in an idle mode.

9. The method of claim 3, wherein
   the second common prediction model is a model obtained by training the first common prediction model when weight-parameters of a certain number or greater set by the server are received.

10. A method for recognizing a business card by a server through federated learning, the method comprising:
    transmitting a first common prediction model for recognizing text from an image of a business card received by a terminal;
    transmitting, to the terminal, a hyper-parameter for training the first common prediction model;
    receiving a weight-parameter from the terminal; and
    training the first common prediction model using the weight-parameter,
    wherein the first common prediction model is transmitted to at least the terminal among a plurality of terminals.

11. The method of claim 10, further comprising:
    transmitting a second common prediction model to the terminal,
    wherein the second common prediction model is obtained by training the first common prediction model using the weight-parameter.

12. The method of claim 10, wherein
    the training of the first common prediction model is performed when the weight-parameters of a certain number or greater are received.

13. The method of claim 11, wherein
    the transmitting of the second common prediction model comprises transmitting a weight-parameter extracted from the second common prediction model.

14. The method of claim 13, wherein
    the transmitting of the second common prediction model to the terminal is performed when a condition set in the terminal is satisfied, and the condition comprises a state where the terminal is being charged, a state where the terminal is connected to Wi-Fi, or a state where the terminal is in an idle mode.

15. A terminal for performing a method for recognizing a business card through federated learning, the terminal comprising:
   a transceiver;
   a memory;
   a display; and
   a processor,
   wherein the processor receives an image of the business card, extracts a feature value from the image including text related to a field of an address book set in the terminal, inputs the feature value into a first common prediction model, determines first text information from an output of the first common prediction model, analyzes a pattern of the first text information, inputs the first text information into the field, caches the first text information and second text information received for error correction of the first text information from a user, and trains the first common prediction model using the image, the first text information, and the second text information,
   wherein the first common prediction model is received through a server and the first text information indicates text which can be mapped by the image.

16. The terminal of claim 15, wherein
the processor updates a weight-parameter of the first common prediction model using a hyper-parameter received from the server through the transceiver to train the first common prediction model.

17. The terminal of claim 16, wherein
the processor deletes the first text information and the second text information, transmits the weight-parameter to the server through the transceiver, and applies a second common prediction model received from the server, and
the second common prediction model is a model obtained by training the first common prediction model by the server using the weight-parameter received from one or more terminals.

18. The terminal of claim 15, wherein
the second text information comprises correct answer text input by the user through an input area of the terminal based on the first text information input to the field, which is recognized by the user through the display.

19. The terminal of claim 17, wherein
the processor trains the first common prediction model using a weight-parameter extracted from the second common prediction model to apply the second common prediction model.

20. The terminal of claim 15, wherein
the processor updates the field stored in the memory on the basis of the second text information.

* * * * *